United States Patent
Walia et al.

(10) Patent No.: US 12,277,190 B2
(45) Date of Patent: Apr. 15, 2025

(54) WEB TASK AUTOMATION WITH VECTORIZATION

(71) Applicant: YAAR INC., Toronto (CA)

(72) Inventors: Karan Walia, Brampton (CA); Anton Mamonov, Toronto (CA); Sobi Walia, Brampton (CA)

(73) Assignees: Karan Walia; Anton Mamonov; Sobi Walia

( * ) Notice: Subject to any disclaimer, the term of this patent is extended or adjusted under 35 U.S.C. 154(b) by 227 days.

(21) Appl. No.: 17/244,558

(22) Filed: Apr. 29, 2021

(65) Prior Publication Data
US 2022/0350858 A1  Nov. 3, 2022

(51) Int. Cl.
  *G06F 16/957* (2019.01)
  *G06F 16/22* (2019.01)
  *G06F 16/28* (2019.01)
  *G06F 16/951* (2019.01)
  *G06F 16/958* (2019.01)
  *G06F 18/22* (2023.01)

(52) U.S. Cl.
  CPC ...... *G06F 16/9577* (2019.01); *G06F 16/2237* (2019.01); *G06F 16/289* (2019.01); *G06F 16/951* (2019.01); *G06F 16/986* (2019.01); *G06F 18/22* (2023.01)

(58) Field of Classification Search
  None
  See application file for complete search history.

(56) References Cited

U.S. PATENT DOCUMENTS

| | | |
|---|---|---|
| 5,809,250 A | 9/1998 | Kisor |
| 6,418,471 B1 | 7/2002 | Shelton et al. |
| 7,200,804 B1 | 4/2007 | Khavari et al. |
| 7,269,633 B2 | 9/2007 | Allan |
| 7,536,389 B1 | 5/2009 | Prabhakar et al. |
| 8,145,705 B1 | 3/2012 | Rust |
| 8,196,118 B2 | 6/2012 | Vainer et al. |
| 8,352,547 B1 | 1/2013 | Rust |
| 8,392,890 B2 | 3/2013 | Miller |
| 8,433,733 B2 | 4/2013 | Sayed et al. |
| 8,495,585 B2 | 7/2013 | Miller |
| 8,577,963 B2 | 11/2013 | Trahan et al. |
| 8,639,680 B1 | 1/2014 | Ciccolo |
| 8,683,447 B2 | 3/2014 | Miller |

(Continued)

FOREIGN PATENT DOCUMENTS

| | | |
|---|---|---|
| WO | WO2019103738 A1 | 5/2019 |
| WO | 2022199806 A1 | 9/2022 |

OTHER PUBLICATIONS

Non-Final Office Action dated Sep. 19, 2022 issued by the USPTO in U.S. Appl. No. 17/244,457.

(Continued)

*Primary Examiner* — Ariel Mercado-Vargas

(57) ABSTRACT

A system and method uses a vectorization model to determine similar elements within a web page to the known web page. The vectorization model takes a known web element and generates a first set of vectors, representative of the various properties of the web element. A vectorization model generates a second set of vectors for each element in a new web page. The first set of vectors is compared to each second set of vectors for each element in the new web page to select the most similar web element.

21 Claims, 31 Drawing Sheets

(56) References Cited

U.S. PATENT DOCUMENTS

| | | | |
|---|---|---|---|
| 8,706,860 B2 | 4/2014 | Trahan et al. | |
| 8,799,412 B2 | 8/2014 | Trahan et al. | |
| 8,954,416 B2 | 2/2015 | Tuttle | |
| 8,984,491 B2 | 3/2015 | Miller | |
| 9,195,768 B2 | 11/2015 | Jenkins et al. | |
| 9,363,134 B1 | 6/2016 | Goodspeed | |
| 9,418,172 B2 | 8/2016 | White et al. | |
| 9,531,825 B1 | 12/2016 | Brooks et al. | |
| 9,594,845 B2 | 3/2017 | Bengualid et al. | |
| 9,621,406 B2 | 4/2017 | Trahan et al. | |
| 9,740,791 B1 | 8/2017 | Killian | |
| 9,747,262 B1 | 8/2017 | Liu | |
| 9,753,843 B2 | 9/2017 | Kandpal | |
| 9,880,994 B1* | 1/2018 | Choi | G06F 40/186 |
| 9,940,396 B1 | 4/2018 | Willhoit | |
| 10,050,849 B1 | 8/2018 | Long | |
| 10,083,159 B1* | 9/2018 | Bekmambetov | G06F 3/0481 |
| 10,362,090 B2 | 7/2019 | Mahamuni et al. | |
| 10,366,140 B2 | 7/2019 | Butt et al. | |
| 10,382,386 B2 | 8/2019 | Gissing et al. | |
| 10,394,925 B2 | 8/2019 | Bengualid et al. | |
| 10,482,083 B2 | 11/2019 | Duke | |
| 10,489,286 B2 | 11/2019 | Miller | |
| 10,628,630 B1 | 4/2020 | Surace | |
| 10,686,738 B2 | 6/2020 | Daniel et al. | |
| 10,719,573 B2 | 7/2020 | Dube-Cousineau | |
| 10,884,907 B1 | 1/2021 | Zhao et al. | |
| 10,949,748 B2 | 3/2021 | Williams et al. | |
| 11,016,967 B2 | 5/2021 | Duke | |
| 11,263,118 B2 | 3/2022 | Bhadani | |
| 11,507,497 B2 | 11/2022 | Zhao et al. | |
| 11,636,252 B1 | 4/2023 | Myers | |
| 11,803,415 B2 | 10/2023 | Dunn | |
| 2003/0005044 A1 | 1/2003 | Miller et al. | |
| 2003/0216913 A1 | 11/2003 | Keely | |
| 2004/0100507 A1 | 5/2004 | Hayner et al. | |
| 2004/0111488 A1 | 6/2004 | Allan | |
| 2008/0077671 A1 | 3/2008 | Rust | |
| 2008/0228494 A1 | 9/2008 | Cross | |
| 2008/0235564 A1 | 9/2008 | Erol | |
| 2009/0019354 A1 | 1/2009 | Jaiswal et al. | |
| 2009/0100345 A1 | 4/2009 | Miller | |
| 2010/0095208 A1 | 4/2010 | White et al. | |
| 2011/0191676 A1 | 8/2011 | Guttman et al. | |
| 2011/0258532 A1 | 10/2011 | Ceze | |
| 2012/0045132 A1 | 2/2012 | Wong | |
| 2012/0079395 A1 | 3/2012 | Bengualid et al. | |
| 2012/0117455 A1 | 5/2012 | Fogel et al. | |
| 2012/0166933 A1 | 6/2012 | Cui | |
| 2012/0331375 A1 | 12/2012 | Fanning | |
| 2013/0007100 A1 | 1/2013 | Trahan et al. | |
| 2013/0007101 A1 | 1/2013 | Trahan et al. | |
| 2013/0007102 A1 | 1/2013 | Trahan et al. | |
| 2013/0007241 A1 | 1/2013 | Trahan et al. | |
| 2013/0054675 A1 | 2/2013 | Jenkins et al. | |
| 2013/0151600 A1 | 6/2013 | Miller | |
| 2013/0151949 A1 | 6/2013 | Miller | |
| 2013/0159317 A1* | 6/2013 | Huang | G06F 16/9535 |
| | | | 707/E17.084 |
| 2013/0219368 A1 | 8/2013 | Carteri et al. | |
| 2013/0227397 A1 | 8/2013 | Tvorun | |
| 2013/0254139 A1 | 9/2013 | Lei | |
| 2013/0290858 A1* | 10/2013 | Beveridge | G06F 3/0482 |
| | | | 715/740 |
| 2013/0332398 A1 | 12/2013 | Wu | |
| 2013/0332484 A1 | 12/2013 | Gajic | |
| 2013/0332815 A1 | 12/2013 | Gallo | |
| 2014/0013165 A1 | 1/2014 | Miller | |
| 2014/0136013 A1 | 5/2014 | Wolverton et al. | |
| 2014/0281918 A1 | 9/2014 | Wei | |
| 2014/0373030 A1 | 12/2014 | Francis | |
| 2015/0186249 A1 | 7/2015 | Miller | |
| 2015/0254219 A1 | 9/2015 | Harel | |
| 2015/0324377 A1* | 11/2015 | Hayden | G06F 3/0481 |
| | | | 715/202 |
| 2016/0147645 A1 | 5/2016 | Kandpal | |
| 2016/0188548 A1 | 6/2016 | Ciabarra et al. | |
| 2016/0212073 A1 | 7/2016 | Kulkarni et al. | |
| 2016/0219048 A1 | 7/2016 | Porras et al. | |
| 2016/0224458 A1 | 8/2016 | Spiridonov | |
| 2016/0259508 A1* | 9/2016 | Eccleston | G06F 3/0484 |
| 2017/0104841 A1 | 4/2017 | Duke | |
| 2017/0116179 A1* | 4/2017 | Gagné-Langevin | |
| | | | G06F 40/106 |
| 2017/0124213 A1 | 5/2017 | Bengualid et al. | |
| 2017/0220459 A1 | 8/2017 | Kulkarni | |
| 2017/0220531 A1 | 8/2017 | Hamer | |
| 2017/0337177 A1 | 11/2017 | Maxwell, III | |
| 2018/0046471 A1 | 2/2018 | Peretz et al. | |
| 2018/0123934 A1 | 5/2018 | Gissing et al. | |
| 2018/0173375 A1 | 6/2018 | Webber | |
| 2018/0192108 A1 | 7/2018 | Lyons | |
| 2018/0203674 A1* | 7/2018 | Dayanandan | G06F 8/35 |
| 2018/0314505 A1 | 11/2018 | Wang | |
| 2018/0314513 A1 | 11/2018 | DiTullio | |
| 2019/0020673 A1* | 1/2019 | Weinstein | G06F 16/951 |
| 2019/0228766 A1 | 7/2019 | White et al. | |
| 2019/0317977 A1 | 10/2019 | Butt | |
| 2020/0042516 A1 | 2/2020 | Duke | |
| 2020/0110781 A1 | 4/2020 | Staszak | |
| 2020/0133829 A1 | 4/2020 | Zazo et al. | |
| 2020/0134098 A1 | 4/2020 | Dube-Cousineau | |
| 2020/0143805 A1 | 5/2020 | Roy | |
| 2020/0175430 A1 | 6/2020 | Kochura et al. | |
| 2020/0226126 A1* | 7/2020 | Zou | G06F 40/284 |
| 2020/0364953 A1 | 11/2020 | Simoudis | |
| 2020/0379889 A1* | 12/2020 | Hamid | G06F 9/45558 |
| 2021/0004436 A1 | 1/2021 | Jauhar et al. | |
| 2021/0064821 A1 | 3/2021 | Seth | |
| 2021/0082424 A1 | 3/2021 | Johnson | |
| 2021/0109769 A1 | 4/2021 | Yang | |
| 2021/0119955 A1 | 4/2021 | Penov et al. | |
| 2021/0124675 A1 | 4/2021 | Zhao et al. | |
| 2021/0216442 A1 | 7/2021 | Bhadani | |
| 2021/0232121 A1 | 7/2021 | Pramanick et al. | |
| 2021/0271671 A1 | 9/2021 | Duke | |
| 2021/0303342 A1 | 9/2021 | Dunn | |
| 2022/0198390 A1 | 6/2022 | DeLuca | |
| 2022/0309150 A1 | 9/2022 | Tsirkin | |
| 2022/0342646 A1 | 10/2022 | Ayyalasomayajula | |
| 2023/0018387 A1 | 1/2023 | Kuksta | |

OTHER PUBLICATIONS

Final Office Action dated Apr. 4, 2022 issued by the USPTO in U.S. Appl. No. 17/244,457.

Lau, Tessa et al. "A Conversational Interface to Web Automation", Oct. 3, 2010, ACM. (Year: 2010).

Barman, Shaon et al. Ringer: Web Automation by Demonstration, Nov. 2, 2016, ACM. (Year: 2016).

"Standard ECMA-404: The JSON Data Interchange Syntax", Dec. 2017, Ecma International. (Year 2017).

Non-final Office Action dated Sep. 10, 2021 in U.S. Appl. No. 17/244,457.

Non-Final Office Action mailed by the USPTO on Aug. 25, 2023, in the related U.S. Appl. No. 17/395,229.

Toby Jia-Jun Li, et al., "Interactive Task Learning from GUI-Grounded Natural Language Instructions and Demonstrations", Proceedings of the 58th Annual Meeting of the Association for Computational Linguistics: System Demonstrations, Jul. 5-Jul. 10, 2020, pp. 215 to 223.

Pradip Pramanick, et al., "DeComplex: Task Planning from complex natural instructions by a collocating robot", 2020 IEEE/RSJ International Conference on Intelligent Robots and Systems (IROS), Oct. 25-29, 2020, pp. 6894 to 6901, Las Vegas, NV, USA (Virtual).

Final Office Action mailed by the USPTO on Jul. 10, 2023, in the related U.S. Appl. No. 17/244,457.

Eric, Mihail, et al. "Key-value retrieval networks for task-oriented dialogue." arXiv preprint arXiv:1705.05414 (2017). (Year: 2017).

Office Action issued in U.S. Appl. No. 17/244,457 by the USPTO on Jan. 17, 2024.

(56) References Cited

OTHER PUBLICATIONS

Office Action issued in U.S. Appl. No. 17/395,164 by the USPTO on Jan. 17, 2024.
Office Action issued in U.S. Appl. No. 17/395,229 by the USPTO on Mar. 8, 2024.
Final Office action dated Jul. 24, 2024 issued by USPTO in U.S. Appl. No. 17/244,457.
Notice of Allowance dated Jul. 10, 2024 issued by USPTO in U.S. Appl. No. 17/395,164.
Tuysuz, Avenoglu, and Eren, "A workflow-based mobile guidance framework for managing personal activities", Seventh International Conference on Next Generation Mobile Apps, Services and Technologies, 2013, pp. 13-18, IEEE.
Notice of Allowance dated Sep. 11, 2024 issued by USPTO in U.S. Appl. No. 17/395,229.

\* cited by examiner

700

| Key | Value |
|---|---|
| EMAIL_ADDRESS | douglas.engelbart@gmail.com |
| EMAIL_SUBJECT | Hey Yaar |
| BODY_MESSAGE | Doug look at me click, type, select and tap! :D |
| CC | karan@yaar.ai, anton@yaar.ai, sobi@yaar.ai |
| BCC | armand@yaar.ai |

| Step | Key | Value | Object Model xPath | Action |
|---|---|---|---|---|
| 1 | URL | http://gmail.com | URL_LOAD(); | NULL |
| 2 | | | Body_Table_Div_ComposeButton | LeftClick |
| 3 | | | Body_Table_Div_EMAILADDRESS | LeftClick |
| 4 | EMAIL_ADDRESS | douglas.engelbart@gmail.com | Body_Table_Div_EMAILADDRESS | TextEntry |
| 5 | | | Body_Table_Div_SUBJECT | LeftClick |
| 6 | EMAIL_SUBJECT | Hey Yaar | Body_Table_Div_SUBJECT | TextEntry |
| 7 | | | Body_Table_Div_MESSAGE | LeftClick |
| 8 | BODY_MESSAGE | Doug look at me click, type, select and tap! :D | Body_Table_Div_MESSAGE | TextEntry |
| 9 | | | Body_Table_Div_CC | LeftClick |
| 10 | CC | karan@yaar.ai, anton@yaar.ai, sobi@yaar.ai | Body_Table_Div_CC | TextEntry |
| 11 | | | Body_Table_Div_BCC | LeftClick |
| 12 | BCC | armand@yaar.ai | Body_Table_Div_BCC | TextEntry |
| 13 | | | Body_Table_Div_SendButton | LeftClick |

FIG. 9

| Step | Key | Value | Object Model xPath | Action | Conditionality |
|---|---|---|---|---|---|
| 1 | URL | http://gmail.com | URL_LOAD(); | NULL | ROOT |
| 2 | | | Body_Table_Div_ComposeButton | LeftClick | ROOT |
| 3 | | | Body_Table_Div_EMAILADDRESS | LeftClick | ROOT |
| 4 | EMAIL_ADDRESS | douglas.engelbart@gmail.com | Body_Table_Div_EMAILADDRESS | TextEntry | ROOT |
| 5 | | | Body_Table_Div_SUBJECT | LeftClick | ROOT |
| 6 | EMAIL_SUBJECT | Hey Yaar | Body_Table_Div_SUBJECT | TextEntry | CONDITIONAL |
| 7 | | | Body_Table_Div_MESSAGE | LeftClick | CONDITIONAL |
| 8 | BODY_MESSAGE | Doug look at me click, type, select and tap! :D | Body_Table_Div_MESSAGE | TextEntry | CONDITIONAL |
| 9 | | | Body_Table_Div_CC | LeftClick | CONDITIONAL |
| 10 | CC | karan@yaar.ai, anton@yaar.ai, sobi@yaar.ai | Body_Table_Div_CC | TextEntry | CONDITIONAL |
| 11 | | | Body_Table_Div_BCC | LeftClick | CONDITIONAL |
| 12 | BCC | armand@yaar.ai | Body_Table_Div_BCC | TextEntry | CONDITIONAL |
| 13 | | | Body_Table_Div_SendButton | LeftClick | ROOT |

FIG. 9A

| Step | Key | Value | Object Model xPath | Action |
|---|---|---|---|---|
| 1 | URL | http://hotmail.com | URL_LOAD(); | NULL |
| 2 | | | Body_Table_Div_ComposeButton | LeftClick |
| 3 | | | Body_Table_Div_EMAILADDRESS | LeftClick |
| 4 | EMAIL_ADDRESS | alan.turing@higher.conscious | Body_Table_Div_EMAILADDRESS | TextEntry |
| 5 | | | Body_Table_Div_SUBJECT | LeftClick |
| 6 | EMAIL_SUBJECT | Your Yaar | Body_Table_Div_SUBJECT | TextEntry |
| 7 | | | Body_Table_Div_MESSAGE | LeftClick |
| 8 | BODY_MESSAGE | Does this mean I've passed the Turing test now? =D | Body_Table_Div_MESSAGE | TextEntry |
| 9 | | | Body_Table_Div_CC | LeftClick |
| 10 | CC | karan@yaar.ai, anton@yaar.ai, sobi@yaar.ai | Body_Table_Div_CC | TextEntry |
| 11 | | | Body_Table_Div_BCC | LeftClick |
| 12 | BCC | armand@yaar.ai | Body_Table_Div_BCC | TextEntry |
| 13 | | | Body_Table_Div_SendButton | LeftClick |

FIG. 14

| Step | Key | Value | Object Model xPath | Action | Conditionality |
|---|---|---|---|---|---|
| 1 | URL | http://hotmail.com | URL_LOAD(); | NULL | ROOT |
| 2 | | | Body_Table_Div_ComposeButton | LeftClick | ROOT |
| 3 | EMAIL_ADDRESS | alan.turing@higher.conscious | Body_Table_Div_EMAILADDRESS | LeftClick | ROOT |
| 4 | | | Body_Table_Div_EMAILADDRESS | TextEntry | ROOT |
| 5 | EMAIL_SUBJECT | Your Yaar | Body_Table_Div_SUBJECT | LeftClick | ROOT |
| 6 | | | Body_Table_Div_SUBJECT | TextEntry | CONDITIONAL |
| 7 | BODY_MESSAGE | Does this mean I've passed the Turing test now? =D | Body_Table_Div_MESSAGE | LeftClick | CONDITIONAL |
| 8 | | | Body_Table_Div_MESSAGE | TextEntry | CONDITIONAL |
| 9 | CC | karan@yaar.ai, anton@yaar.ai, sobi@yaar.ai | Body_Table_Div_CC | LeftClick | CONDITIONAL |
| 10 | | | Body_Table_Div_CC | TextEntry | CONDITIONAL |
| 11 | BCC | armand@yaar.ai | Body_Table_Div_BCC | LeftClick | CONDITIONAL |
| 12 | | | Body_Table_Div_BCC | TextEntry | CONDITIONAL |
| 13 | | | Body_Table_Div_SendButton | LeftClick | ROOT |

FIG. 14A

WEB TASK AUTOMATION WITH VECTORIZATION

FIELD

This disclosure relates to automating a task on a web page.

BACKGROUND

Web task automation refers to a process of using automation tools to execute tasks performed through an internet browser. Some forms of web automation may be performed using a variety of web browser software running on a personal computer (such as a desktop or a laptop), a tablet, or a smart phone. Examples of web tasks may include sending an email, scheduling a calendar event, implementing a search using a search engine, searching through an inbox, scheduling a reminder, etc. Further examples include interfacing with other web applications, such as Uber™ to book a ride, make an appointment, or scheduling calendar events with multiple people for specific times.

A conventional web browser is a software component that, when executed by a processor, can cause the processor to retrieve files from a remote server to display to a user, to thereby, allow for interaction between the user and the files. These files may contain code that may be interpreted and executed, or otherwise executed—such as Hypertext Markup Language (HTML) code, Cascading Style Sheets (CSS) code, JavaScript™ code, and more. A web browser may cause the processor to implement an instance of a web engine to determine what to display to the user on a user interface (such as a screen) based on the files retrieved. The content may be displayed as a webview or using a headless browser—an instance of the browser engine presented in a frame that may be native to the browser or be part of some other application. In generating a display of a web page, the browser may turn the file or files retrieved from the remote server into an object model, such as a Document Object Model (DOM). An object model may contain a hierarchical tree-like structure that establishes parent-child relationships between the various elements of the web page that are to be rendered on the user interface. A browser may have additional functions and may perform other tasks within a computing system.

Many interactions between a human and a computing device require an action through a Graphic User Interface (GUI). Often, such action can include using a mouse or similar component of the electronic device to implement navigation actions and item selection actions within the interface, and using a keyboard component of the electronic device to implement text entry actions and number entry actions. To accomplish a single task on a web page loaded using a personal computer, a user typically carries out a series of actions. On a conventional personal computer these may take the form of mouse actions and keyboard actions. Similarly, on a smart phone or tablet device, a user may interface with a touchscreen, voice interface or the like to accomplish both clicking and typing actions.

Consistent with human progress being associated with automating everything that can be automated, there is perceived a need to automate the carrying out of tasks on a web page, so that a user does not need to carry out as many interactions with their device. Further, such automation is preferably not based on a rigid model, as web pages can often change their internal structures and programming. Therefore, an adaptable solution would be preferred.

SUMMARY

Web tasks may be executed automatically through an application-specific API or by controlling a web browser. Aspects of the present application involve considering web task automation as a sequential, template-matching problem, using a recorded demonstration as a reference template. The recorded demonstration may be adapted to a similar task to the desired task. The user may supply a single command in the form of a snippet of text, or voice command to arrange the carrying out of an automated web task. Accordingly, the user no longer needs a mouse or a keyboard to arrange the carrying out of web tasks, where such arranging would normally have required an exhaustive amount of clicking on the mouse and typing on the keyboard.

According to aspects of the present application, three components may be used: a modelling component; a recorder component; and a playback component. With these three components working together, such a solution may operate based on one or more demonstrations of a web task before the web task may be performed autonomously. In the event that multiple recordings are provided for the same task, the recorder component merges those multiple recordings algorithmically into one recording. The modelling component is responsible for generating a repository of demonstrations to assist in determining the specific web element within an object model unto which to perform each action in a series when executing a web task. The recorder component is responsible for feeding the modelling component with demonstrations of new tasks. The playback component is responsible for selecting the intended task and arranging the performing of the actions in a series as defined by the modelling component.

To support a new task, a user may initially define key value pairs and carry out each action of the new task according to the defined key value pairs. A recorded performance skeleton is stored in a centralized task database, with each entry in the database corresponding to a sequence of indexed actions, each action performed on object model elements of a web page associated with the task. Each task database entry is referred to as a demonstration of the task.

If multiple recorded performance skeletons are generated for the performance of a single task, a conditional recorded performance skeleton may be generated for the task performance. A conditional recorded performance skeleton includes all possible actions, arranged in an indexed order for performing a task based on the various recorded demonstrations, and the conditionalities for when to perform the action.

When a user requests that a predefined task be carried out, say, by uttering a natural language task request or entering a command, the actions required to complete the task are sequentially generated and carried out, wherein the actions are determined based on an association between an interpretation of the task request and an original recorded demonstration. The process of autonomously carrying out these actions is referred to as a playback of the demonstration. A user has some flexibility to vary the parameters of the playback. This variation allows the user to carry out new tasks that are similar in nature to the demonstration.

In accordance with one aspect of the present application, there is provided a computer-implemented method of recording a task to be performed on a web page, the task including a plurality of actions. The method includes retrieving the web page having a plurality of elements, creating an object model of the web page, receiving an indication of task data entered on the web page, the task data including a plurality of attributes, subsequent to an action among the plurality of actions having been carried out and receiving a notification that an input event has occurred in relation to a particular element among the plurality of elements, the notification including an indication of a value associated with a particular attribute among the plurality of attributes included in the task data. Responsive to the receiving the notification, updating the object model to, thereby, generate an updated object model; storing, in a store and associated with a representation of the action, a representation of the updated object model, the representation of the action including an indication of the input event, an indication of the particular attribute, the indication of the value and an indication of the particular element and receiving a stop instruction.

In accordance with other aspects of the application, there is provided an automated computer-implemented method of executing a task on a web page, the task made up of actions, the web page being rendered by a headless browser using an object model. The method including receiving an action message containing instructions for the headless browser to perform an action on the web page, performing the action, detecting a change in the object model caused by the performing the action, determining that the change in the object model has completed, sending an update message containing the change in the object model caused by the performing the action and receiving a next action message, the next action message containing instructions for the headless browser to perform a next action on the web page.

In accordance with other aspects of the application, there is provided a computer-implemented method of selecting a new web element among a plurality, "n," of new web elements in a new web page, the selected new web element related to a known web element, where interaction with the known web element has been previously recorded. The method includes storing a first set of vectors for the known web element; storing n second sets of vectors, one second set of vectors for each new web element among the n new web elements, each second set of vectors having a plurality, "m," of vectors; wherein each vector among the m vectors in each second set of vectors among the second sets of vectors has a corresponding vector in the first set of vectors; for each second set of vectors of the n second sets of vectors, generating a similarity score between: each vector in the first set of vectors; and the corresponding vector in the each second set of vectors; and selecting the new web element having the second set of vectors with the highest similarity score, thereby identifying the selected new web element that is most related to the known web element.

In accordance with other aspects of the application, there is provided an automated computer-implemented method of executing a task on a web page, the task made up of actions, the web page being rendered by a headless browser using an object model. The method includes receiving an action message containing instructions for the headless browser to perform an action on the web page; performing the action; detecting a change in the object model caused by the performing the action; determining that the change in the object model has completed; sending an update message containing the change in the object model caused by the performing the action; and receiving a next action message, the next action message containing instructions for the headless browser to perform a next action on the web page.

In accordance with other aspects of the application, there is provided an automated computer-implemented method of executing a task across a first web page and a second web page, the task made up of actions, each of the first web page and the second web page being rendered by a corresponding first headless browser and second headless browser using a corresponding first object model and second object model. The method includes receiving an action message containing instructions for the first headless browser to perform an action on the first web page, performing the action on the first web page, detecting a change in the first object model caused by the performing the action, such that an updated first object model is generated, responsive to detecting the change, transmitting a representation of the action and a representation of the updated first object model, receiving a next action message containing instructions for the second headless browser to perform a next action on the second web page, interpreting the next action message and, responsive to the interpreting, performing the next action on the second web page.

In accordance with other aspects of the application, there is provided an automated computer-implemented method of executing a task. The method includes receiving a natural language input indicative of the task; resolving the task, based on the natural language input; determining a first action for the task, wherein the first action is to be carried out on a web page rendered by a headless browser, the rendering including generating an object model of the web page; sending a first action message, the first action message containing instructions for the headless browser to perform the first action; receiving an update message, the update message related to the first action and including information about the object model of the first web page; responsive to the receiving the update message, determining, based on the update message, a second action for the task; and sending a second action message, the second action message containing instructions for the headless browser to perform the second action.

In accordance with other aspects of the application, there is provided an automated computer-implemented automated method of executing a task. The method includes receiving a natural language input indicative of the task; resolving the task, based on the natural language input; determining a first action for the task, wherein the first action is to be carried out on a first web page rendered by a headless browser, the rendering including generating an object model of the first web page; sending a first action message, the first action message containing instructions for the headless browser to perform the first action; receiving an update message, the update message related to the first action and including information about the object model of the first web page; responsive to the receiving the update message, determining, based on the update message, a second action for the task, wherein the second action is to be carried out on a second web page; sending a second action message, the second action message containing instructions for the headless browser to perform the second action.

In accordance with other aspects of the application, there is provided an automated computer-implemented method of generating a conditional recorded performance skeleton for carrying out a task on a browser, the conditional recorded performance skeleton having an ordered plurality of actions, each action to be performed on an element of an object model. The method includes receiving a plurality of recorded performance skeletons, each recorded performance skeleton for carrying out the task; determining, from the plurality of recorded performance skeletons: a root performance skeleton having an ordered plurality of root actions; and an indirect performance skeleton having the ordered plurality of root actions and a plurality of indirect actions; generating the conditional recorded performance skeleton, wherein the ordered plurality of actions of the conditional recorded performance skeleton includes the ordered plurality of root actions and the plurality of indirect actions.

In accordance with other aspects of the application, there is provided an automated computer-implemented method of executing a desired task. The method includes receiving a natural language input indicative of the desired task; resolving, for the task, based on the natural language input, a conditional recorded performance skeleton, wherein the conditional recorded performance skeleton includes an ordered plurality of recorded actions, the plurality of recorded actions including root actions and indirect actions for performing a related task, where the related task is similar to the desired task; generating, for the desired task, a conditional playback performance skeleton, wherein the conditional playback performance skeleton includes an ordered plurality of playback actions, the generating based on the ordered plurality of recorded actions and the natural language input; determining, from among the ordered plurality of playback actions, a first playback action; sending a first action message, the first action message containing instructions for a headless browser to perform the first playback action; receiving an update message, the update message related to the first playback action and including information about an object model of a web page; responsive to the receiving the update message, determining, based on the update message and the conditional playback performance skeleton, a second playback action for the task; and sending a second action message, the second action message containing instructions for the headless browser to perform the second playback action.

In accordance with other aspects of the application, there is provided a computer-implemented method of selecting a new web element among a plurality, "n," of new web elements in a new web page, the selected new web element related to a known web element, where interaction with the known web element has been previously recorded. The method includes receiving a position and dimensions for the known web element; receiving a position and dimensions for each new web element among the n new web elements; for each new web element among the n new web elements, generating a similarity score between: the position and dimensions of the known web element; and the position and dimensions of the each n new web element; and selecting the new web element with the highest similarity score, thereby identifying the selected new web element that is most related to the known web element.

In accordance with other aspects of the application, there is provided a computer-implemented method of selecting a new web element among a plurality, "n," of new web elements in a new web page, the selected new web element related to a known web element, where interaction with the known web element has been previously recorded. The method includes storing a first set of vectors for the known web element, storing n second sets of vectors, one second set of vectors for each new web element among the n new web elements, each second set of vectors having a plurality, "m," of vectors, wherein each vector among the m vectors in each second set of vectors among the second sets of vectors has a corresponding vector in the first set of vectors. For each second set of vectors of the n second sets of vectors, generating a similarity score between: each vector in the first set of vectors; and the corresponding vector in the each second set of vectors. Upon determining that no second set of vectors have a similarity score above a threshold: establishing a virtual network computing (VNC) connection to an electronic device; transmitting a visual representation of the new web page; receiving an indication of a pixel location of a particular web element in the visual representation; and selecting as the new web element the particular web element at the pixel location.

BRIEF DESCRIPTION OF DRAWINGS

Embodiments will be described, by way of example only, with reference to the accompanying figures in which:

FIG. 7 illustrates an example database of key-value pairs, according to one embodiment;

FIG. 9 illustrates an example recorded performance skeleton, according to one embodiment;

FIG. 9A illustrates an example conditional recorded performance skeleton, according to one embodiment;

FIG. 14 illustrates an example playback performance skeleton, according to one embodiment;

FIG. 14A illustrates an example conditional playback performance skeleton, according to another embodiment;

DETAILED DESCRIPTION

For illustrative purposes only, specific example embodiments will now be detailed below in conjunction with the figures.

Figure 1:
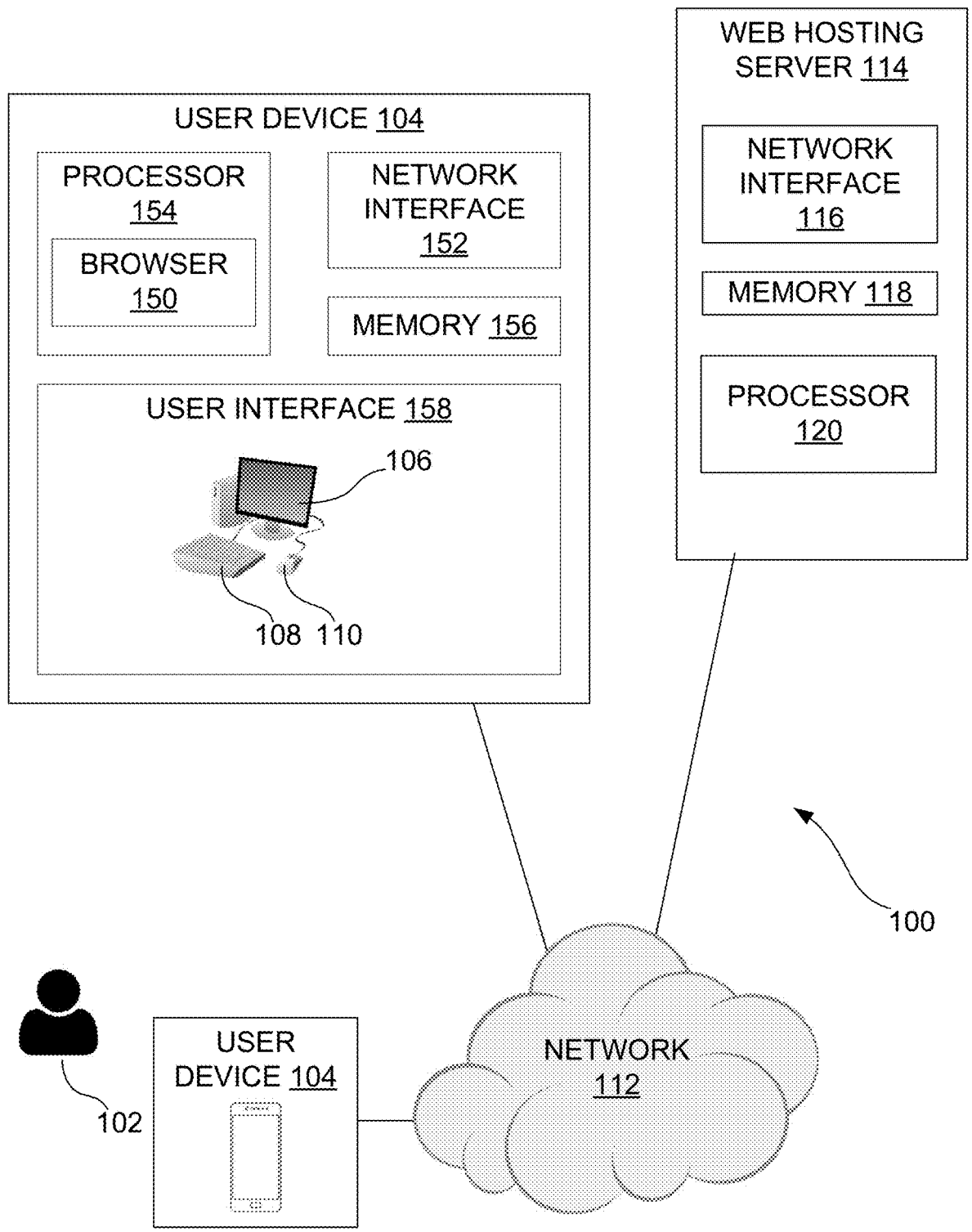
FIG. 1 illustrates a system including an electronic device in communication with a web hosting server via a network.

FIG. 1 illustrates an environment 100 in which a user 102 may interact with an electronic computing device (a user device) 104 to load a web page available from a web hosting server 114. The actions of selecting a web page, retrieving web page data associated with the web page, rendering that data, and displaying the web page to the user is known and is often referred to as "web browsing." User device 104 can send a request over a network 112 to retrieve, from web hosting server 114, a web page. User device 104 may include a screen 106 (which may be a touch screen), a keyboard 108 and a mouse 110. According to some embodiments, user device 104 may be a smart phone or a tablet. User device 104 is illustrated as including a browser 150 implemented by a user device processor 154, a user device network interface 152, a user device memory 156, and a user interface 158. Web hosting server 114 is illustrated as including a web hosting server network interface 116, a web hosting server processor 120, and a web hosting server memory 118. User device processor 154 and web hosting server processor 120 may be implemented as one or more processors configured to execute instructions stored in a memory (e.g., in user device memory 156 or web hosting server memory 118, as appropriate). Alternatively, some or all of user device processor 154 and web hosting server processor 120 may be implemented using dedicated circuitry, such as a programmed field-programmable gate array (FPGA), a graphical processing unit (GPU), or an application-specific integrated circuit (ASIC). Web hosting server processor 120 may directly perform or may instruct web hosting server 114 to perform the functions of web hosting server 114 explained herein.

According to one embodiment, network 112 may be a packet-switched data network, including a cellular network, a Wi-Fi network or other wireless or wired local area network (LAN), a WiMAX network or other wireless or wired wide area network (WAN), etc. Web hosting server 114 may also communicate with other servers (not shown) in network 112.

A web request sent from user device 104 indicates a web page in the form of a server resource (e.g., a location or function/operation), within web hosting server 114, to which user device 104 is requesting access. For example, a web request may be a request to receive a home web page of an online store, to receive a web page associated with a web app (such as an email web page or a calendar web page), etc. A web request from user device 104 is sent over network 112 to web hosting server 114, and is received by web hosting server network interface 116 and processed by web hosting server processor 120 having access to web hosting server memory 118. Responsive to the request, web hosting server 114 will send back to user device 104, via network interface 116 and over network 112, data for allowing user device 104 to render the web page.

Figure 2:
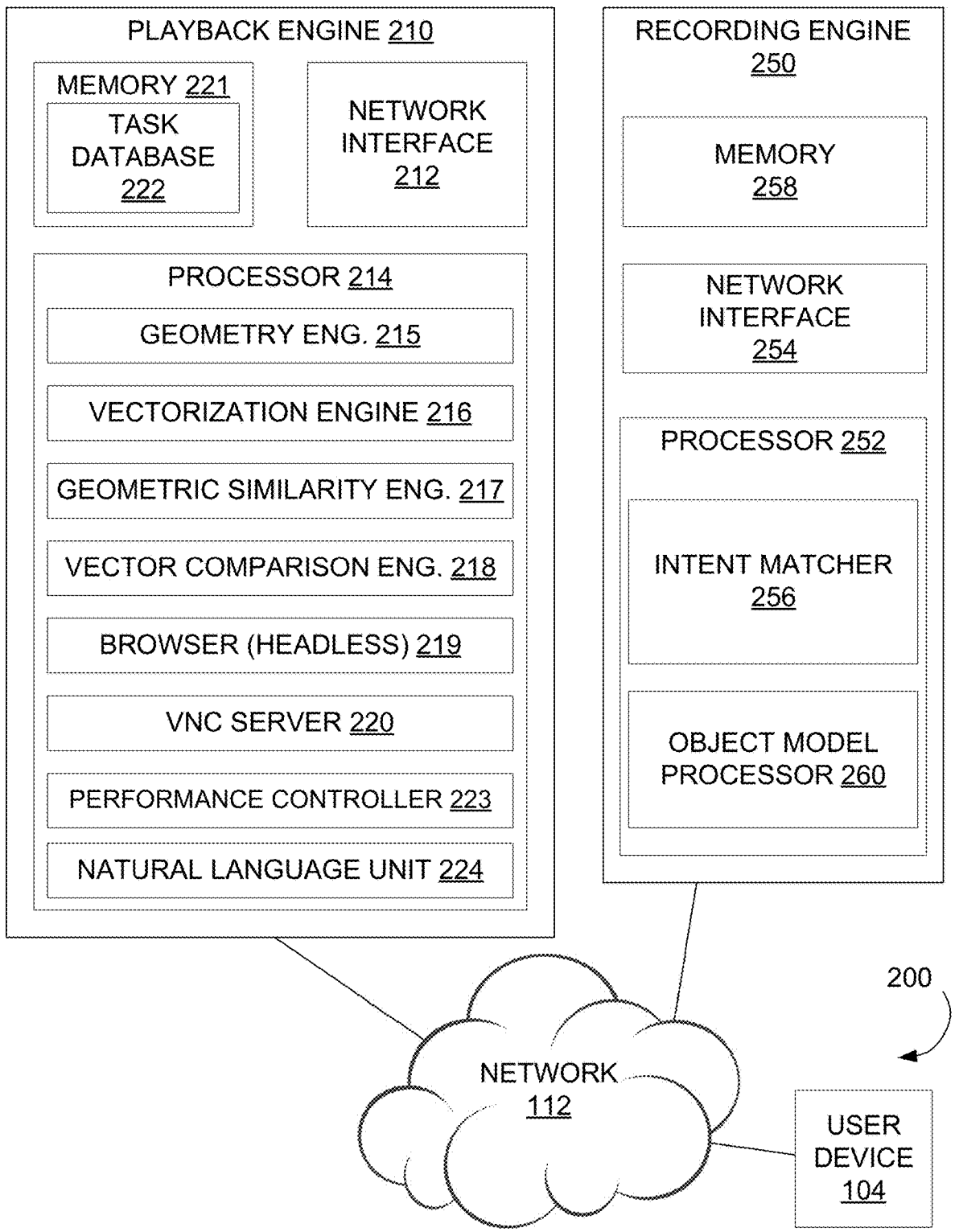
FIG. 2 illustrates a system including the electronic device of FIG. 1, a recording engine and a playback engine, according to one embodiment.

FIG. 2 illustrates an environment 200 for carrying out a task. Environment 200 includes user device 104, that can communicate over network 112 with a playback engine 210 and a recording engine 250. Playback engine 210 includes a playback engine network interface 212, a playback engine memory 221, and a playback engine processor 214. Playback engine processor 214 is capable of implementing a vectorization engine 216, a geometry engine 215, a geometric similarity engine 217, a vector comparison engine 218, an instance of a headless browser 219, an instance of a Virtual Network Computing (VNC) server 220, a performance controller 223, and a natural language unit (NLU) 224. Memory 221 of playback engine 210 includes a task database 222 that stores recorded performance skeletons. Recording engine 250 includes a recording engine processor 252, a recording engine network interface 254, and a recording engine memory 258. Recording engine processor 252 is capable of implementing an intent matcher 256 and an object model processor 260.

Each one of browser 150, object model processing module 260, natural language unit 224, vectorization engine 216, geometry engine 215, geometric similarity engine 217, vector comparison engine 218, headless browser 219, VNC server 220, object model processor 260, and intent matcher 256 (collectively "functional blocks") may be implemented by one or more processors that execute instructions stored in memory, e.g., in memory 221. The instructions, when executed by the one or more processors, cause the one or more processors to perform the operations of the respective functional blocks. Alternatively, some or all of the functional blocks may be implemented using dedicated circuitry, such as via an ASIC, a GPU, or an FPGA that performs the operations of the functional blocks, respectively.

A user (such as user 102) may interact with user interface 158, either to record a new task or to start playback of a pre-defined task. The recording and playback will be described in relation to further figures.

Aspects of the present application relate to recording a new task to be performed on a web page.

Figure 3:
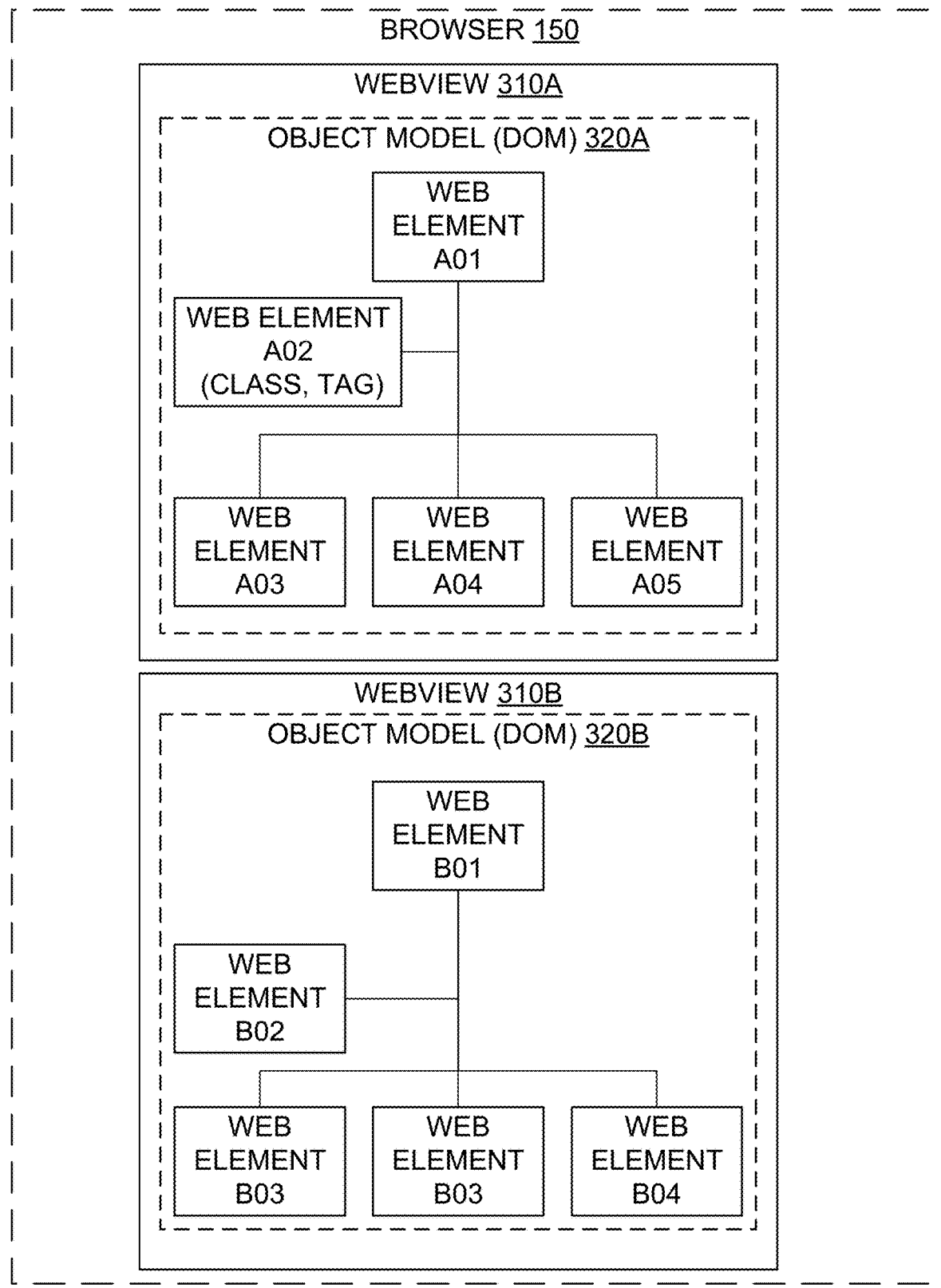
FIG. 3 illustrates a model of a manner in which a web page may be rendered on an electronic device, according to one embodiment.

As illustrated in FIG. 3, browser 150 is illustrated as managing one or more webviews, such as a first webview 310A and a second webview 310B (individually or collectively 310). According to some embodiments, browser 150 may spawn any number of webviews 310. Each webview 310 is typically an instance of the web engine of browser 150, and represents a single window of content of a single web page. Browser 150 requests and retrieves a first web page from web hosting server 114. First webview 310A generates a rendering of the first web page and a first object model 320A for the first web page. Second webview 310B generates a rendering of the second web page and a second object model 320B for the second web page. The first web page is expected to have a plurality of web elements. The second web page is also expected to have a plurality of web elements. Both first object model 320A and second object model 320B can be in the form of a hierarchical tree structure as shown in FIG. 3. First webview 310A can identify individual branches of first object model 320A using classes and tags, or any HTML element attribute, such as inner text, aria-label, etc. Similarly, second webview 310B can identify individual branches of second object model 320B using classes and tags.

A web page may instruct a browser to store data related to a browsing session or activity within the browser. This data may be saved in a memory of a user device (such as user device 104). Data stored related to a browsing session is often referred to as a cookie. An example cookie is an authentication cookie. When the user visits a web server's login page using a browser, the web server may determine a unique session identifier for the browsing session and instruct the browser to store the unique session identifier as an authentication cookie. If the user successfully logs in by providing an appropriate username and password, the server stores, in a server-side database, the unique session identifier, along with an indication that the browsing session associated with the particular unique session identifier has been authenticated (i.e., that the session is for an authenticated user). A subsequent request, from the browser, to load a web page may include the address for the web page and include any cookies related to the web page, such as the authentication cookie containing the unique session identifier. The web server hosting the web page may, upon determining that the cookie is related to an authenticated session, grant the requested access to its services, thereby allowing the browser to load the web page.

Another example cookie may be related to user preferences when loading a web page, such how a user last used a web page. If the web page is a calendar, the web page may store a cookie that includes an indication that the calendar web page was last used in a month view (rather than in a week view).

In another method of processing web content, an instance of a browser may be operated in headless mode (see headless browser 219 in FIG. 2). Headless browser 219 may function in a manner similar to the manner in which browser 150 functions, employing webviews as previously described. However, headless browser 219 may not generate graphic representations of object models 320. Rather, headless browser 219 may download the content for a given web page and leave any downloaded information (i.e., object model 320) in a data-object format or a text-based format, without generating any graphic representation. Headless browser 219 may still interact with a website using clicking or typing actions, however the actions will be performed using action messages (i.e., computer code indicative of a mouse click) directly on the individual branches of object model 320. In one alternative, headless browser 219 may be implemented as the known PhantomJS scriptable headless browser. In another alternative, headless browser 219 may be implemented in the known Selenium automated testing framework.

Cookies may be extracted from browser 150 on user device 104 and sent, over network 112, to a remote web server such as, for example the remote web server hosting playback engine 210. The remote web server may generate headless browser 219 (a browser instance in headless mode). Headless browser 219 may navigate to a specific web page, using cookies received from user device 104. Thereby, headless browser 219 may render the specific web page and load the specific web page in a manner identical to the manner in which the specific web page would be loaded on user device 104, except without generation of a graphic representation. This allows headless browser 219 to load authenticated instances of a web page.

According to some embodiments, the remote server hosting headless browser 219 may include additional software to allow for visual rendering and remote control of the web pages used throughout playback performance. Headless browser 219 may, in some instances, make use of a Virtual Network Computing (VNC) protocol to accomplish visual rendering and remote control of the web pages. A VNC protocol may be seen to use software instructions stored on both the remote web server and user device 104 to establish a VNC connection therebetween. Accordingly, it may be considered that the remote web server includes VNC server instance 220 and user device 104 acts as a VNC client.

A VNC connection may be seen to allow for generation of a visual representation of the web page loaded by the headless browser 219 and for display of the visual representation on user device 104. User device 104 may send, through the VNC connection, specific keyboard and mouse events to the remote web server to be performed on the web page. The VNC connection allows for the visual representation to be updated based on specific events or based on a specific visual representation update rate.

According to some embodiments, VNC server instance 220 may be generated, within playback engine 210, in a task-specific manner. In such an embodiment, performance controller 223 may be containerized as a separate playback server, virtually or otherwise. In these embodiments, an address associated with each task-specific VNC server instance 220 may be bound to a single containerized instance of performance controller 223 having an accessible address. Upon completion of a task, task-specific VNC server instance 220 and the containerized instance of performance controller 223 are deleted.

Since display information associated with VNC server instance 220 may be accessed over a network via a unique URL, the unique URL can be provided to a browser's WebView, thereby allowing information associated with VNC server instance 220 to be displayed on a device (e.g., a laptop computer, a mobile phone, etc.). Once the WebView displays the information associated with VNC server instance 220, the user can interact with playback engine 210 by clicking and typing on the device displaying the information associated with VNC server instance 220. The interaction may act to control the information associated with VNC server instance 220 on the WebView in the same fashion a user would interact with a web page loaded without the use of the VNC protocol. Any data for use by playback engine 210 can also be signaled visually on the VNC server instance 220 by injecting code into VNC server instance 220 to modify the visual representation. For example, if playback engine 210 indicates that a text entry field is necessary, VNC server instance 220 may superimpose a yellow highlight over a region defining the text entry field. A user can respond to the requested changes by playback engine 210 by interacting with the WebView displaying the information associated with VNC server instance 220 through clicking and typing actions. As another example, a user can choose to intervene and select a cheaper Uber transportation or cancel booking a ride altogether upon determining that the fare price is too costly.

Figure 4:
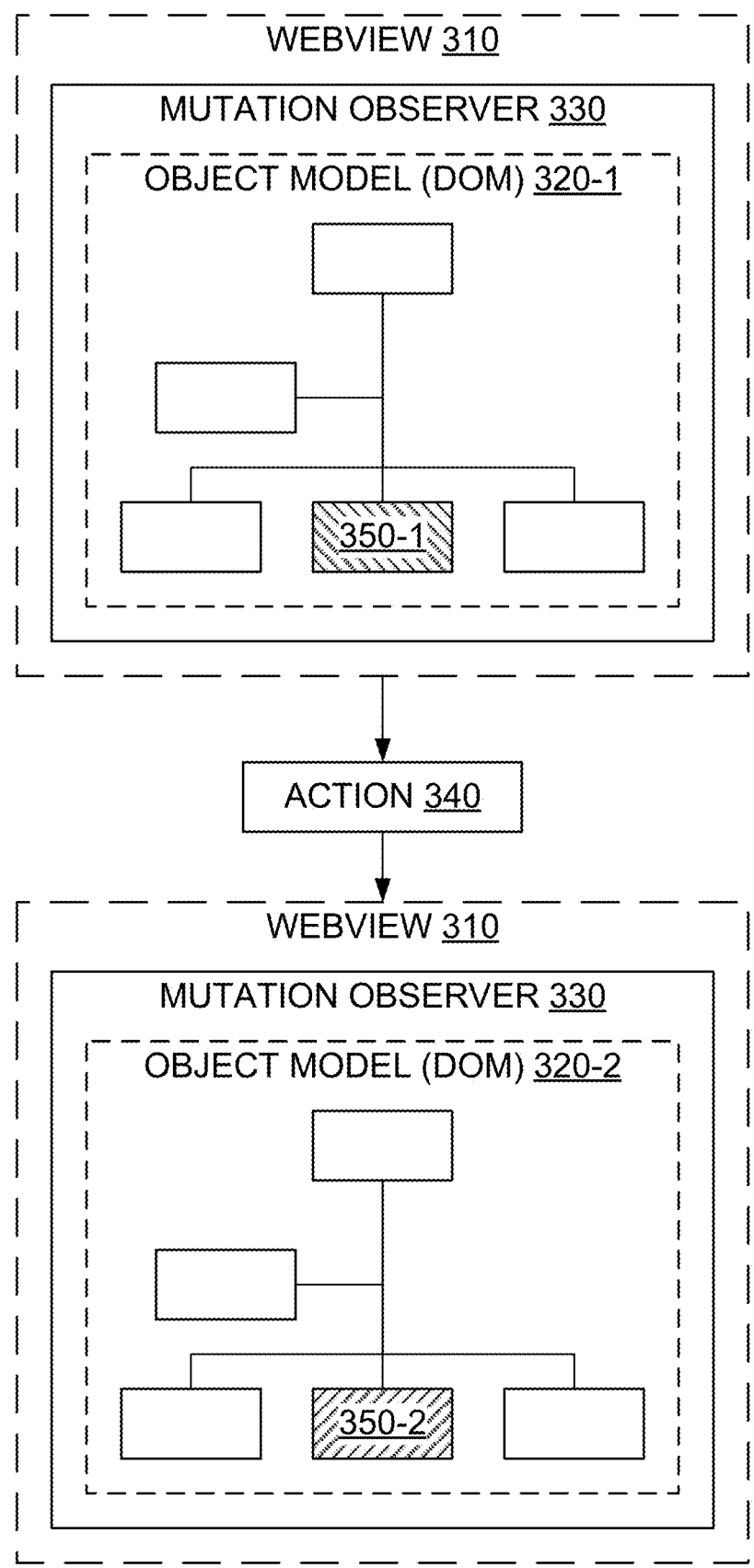
FIG. 4 illustrates a model of a manner in which components executed on the electronic device of FIG. 1 may track changes on a web page, according to one embodiment.

FIG. 4 illustrates a model of tracking changes on a web page, according to one embodiment. According to this embodiment, a mutation observer 330 is employed to detect a change in an initial object model 320-1, which has been generated by a webview 310. Responsive to an action 340 having taken place, FIG. 4 illustrates that a given web element 350 differs between given web element 350-1 in initial object model 320-1 and an updated given web element 350-2 in an updated object model 320-2. Action 340 may be seen to have caused webview 310 to generate updated object model 320-2. Mutation observer 330 can detect that updated object model 320-2 is distinct from initial object model 320-1, and can identify that the change was in given web element 350. Action 340 that caused the change from initial object model 320-1 to updated object model 320-2 may have been a user input event, such as clicking, typing, hovering, scrolling, etc. Action 340 can also have been a change in the web page itself, such as a new email having been received in an inbox, any other web element changing based on any user input or an internal piece of software designed to cause initial object model 320-1 to become updated object model 320-2.

According to some embodiments, performance of a task may require a different amount of actions. For example, if a user were to send a calendar invite, an institutional policy may be implemented on a web page to present a pop-up window to confirm that the calendar invitation may be sent to an email address having an external domain (i.e., any email other than [address]@company.com). Therefore, a user would be required to click on a pop-up window to confirm the invitation recipient. This conditional step would not occur if the email address for the invitation recipient was within the organization. Accordingly, if a user performs a task multiple times for recording, a different number and type of actions may be needed and used in carrying out the playback.

Figure 5:
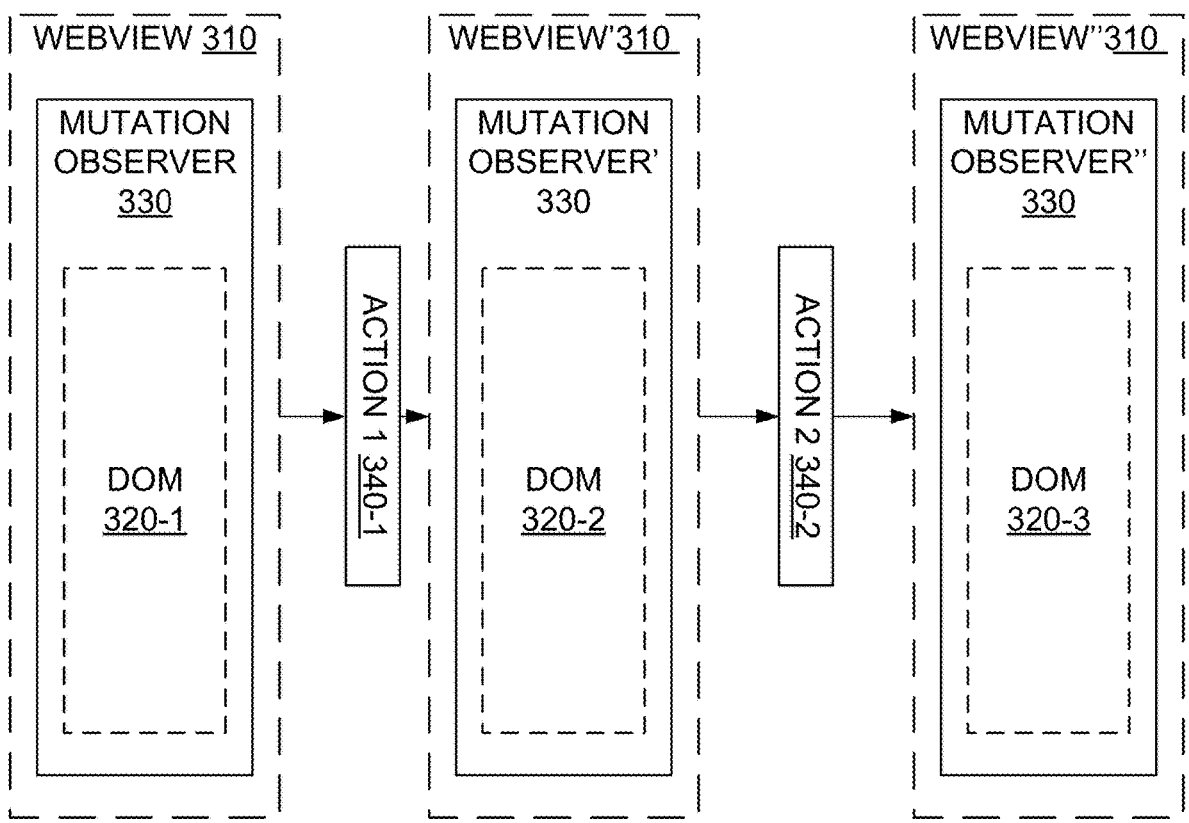
FIG. 5 illustrates a model of a manner in which components executed on the electronic device of FIG. 1 may track changes on a web page, according to another embodiment.

FIG. 5 illustrates a model of tracking changes on a web page in a web view 310, according to another embodiment. In FIG. 5, multiple actions (a first action 340-1 and a second action 340-2) have occurred, changing an object model from an initial object model 320-1 to a once-updated object model 320-2 and, finally, to a twice-updated object model 320-3. Mutation observer 330 detects a change from initial object model 320-1 to once-updated object model 320-2 caused by first action 340-1. Mutation observer 330 also detects a change from once-updated object model 320-2 to twice-updated object model 320-3 caused by second action 340-2. These changes and representations of initial object model 320-1, once-updated object model 320-2, and twice-updated object model 320-3 can be stored in a memory.

Figure 6:
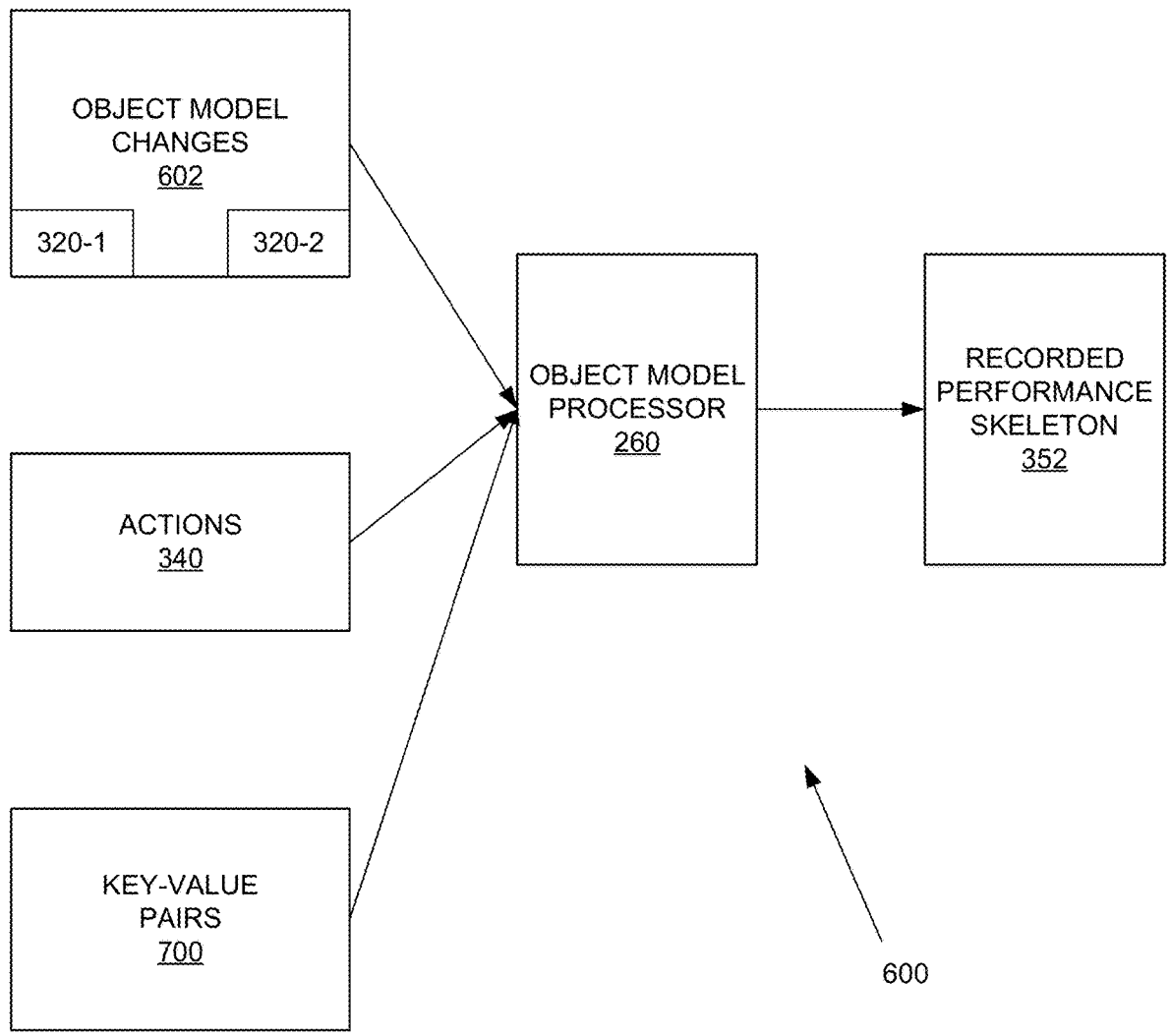
FIG. 6 illustrates a model including an object model processor that may be used for generating a recorded performance skeleton representative of actions performed on a web page and changes to an object model, according to one embodiment.

FIG. 6 is an example illustrative system 600 of the use of object model processor 260 implemented by recording engine processor 252 (FIG. 2). Object model processor 260 receives, as an input, object models 320 and indexed actions 340, wherein actions 340 are indexed by the browser as user 102 interacts with browser 150 using user interface 158 to perform individual actions in performing a task to be recorded. Actions 340 and object models 320 are processed, by object model processor 260 to remove any branches from the object model that are unnecessary or irrelevant for performance of the task. Object model processor 260 may, by such processing, generate a recorded performance skeleton 352. Recorded performance skeleton 352 is a data object comprising the object model elements 350 and the specific actions 340 performed in order to carry out the task as recorded.

Figure 6A:
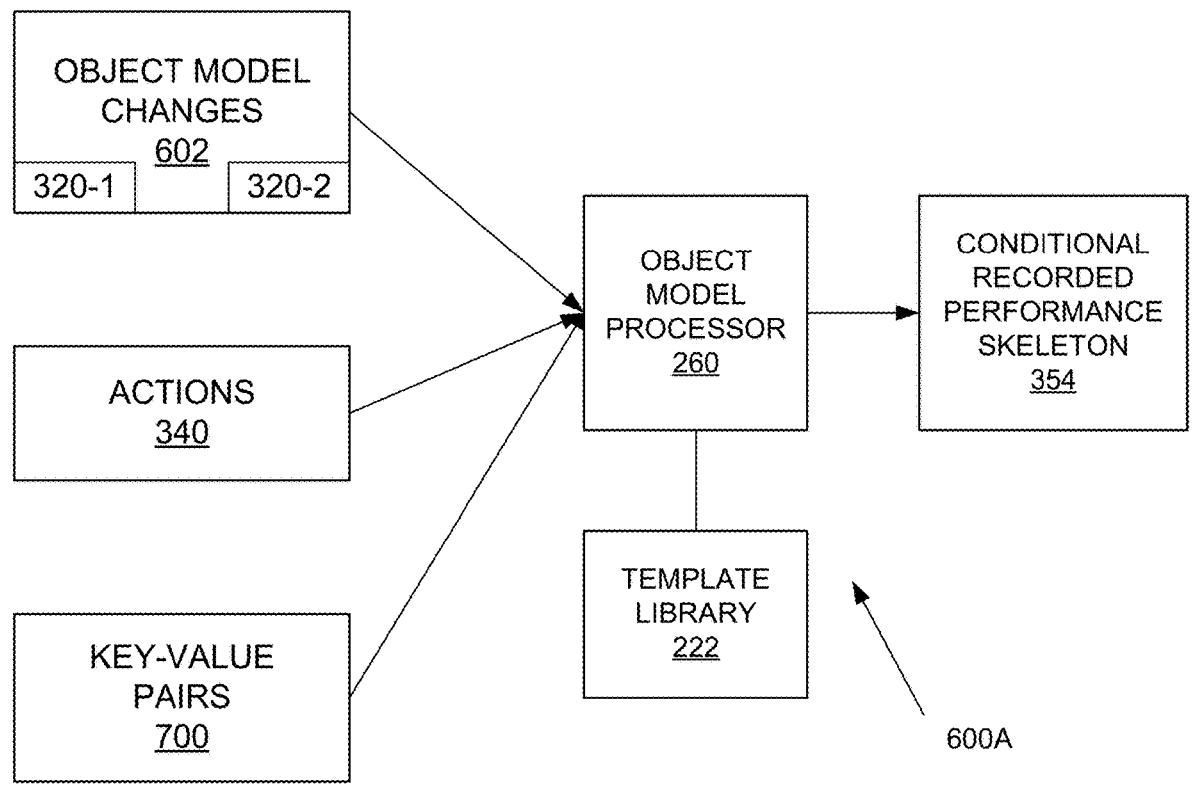
FIG. 6A illustrates a model including an object model processor that may be used for generating a conditional recorded performance skeleton representative of root actions and indirect actions performed on a web page and changes to an object model, according to one embodiment.

FIG. 6A is another example illustrative system 600A of the use of object model processor 260 implemented by recording engine processor 252 (FIG. 2). Object model processor 260 receives, as an input, object models 320 and indexed actions 340, wherein actions 340 are indexed by browser 150 as user 102 interacts with browser 150 using user interface 158 to perform individual actions in performing a task to be recorded. Object model processor 260 has access to template library 222, storing recorded performance skeletons 352 as previously generated. Actions 340 and object models 320 are processed, by object model processor 260 to remove any branches from the object model that are unnecessary or irrelevant for performance of the task. Recorded performance skeletons 352 may be compared to each other to determine root actions and indirect actions. A root step may be considered to be a necessary action to be performed for all recorded instances of task performance, while an indirect step may be an action having a conditionality and, therefore, may not be present in all recorded instances of task recording. For example, in sending an email, a root step may be a text entry for an email address in the TO field, however an indirect step may be a text entry for an email address in the BCC field. Object model processor 260 may, by such processing, generate a conditional recorded performance skeleton 354. Conditional recorded performance skeleton 354 is a data object including references to the object model elements 350, the specific actions 340 to be performed to carry out the task as recorded and an indication regarding whether or not the step is a root step or an indirect step.

FIG. 7 is an example database 700 of key-value pairs 706. A key-value pair 706 includes a key 702 and a value 704. Database 700 has been populated with example data for illustrative purposes. As can be seen, database 700 includes key-value pairs 706 for use in composing an email message. In operation, a user will provide key-value pairs 706 for a task they are wishing to record. For each key 702, value 704 is provided. Key 702 represents a variable for the task operation, and value 704 represents value for key 702. According to some embodiments, key 702 and value 704 are provided by user 102 through user device 104 and user interface 158.

Figure 8:
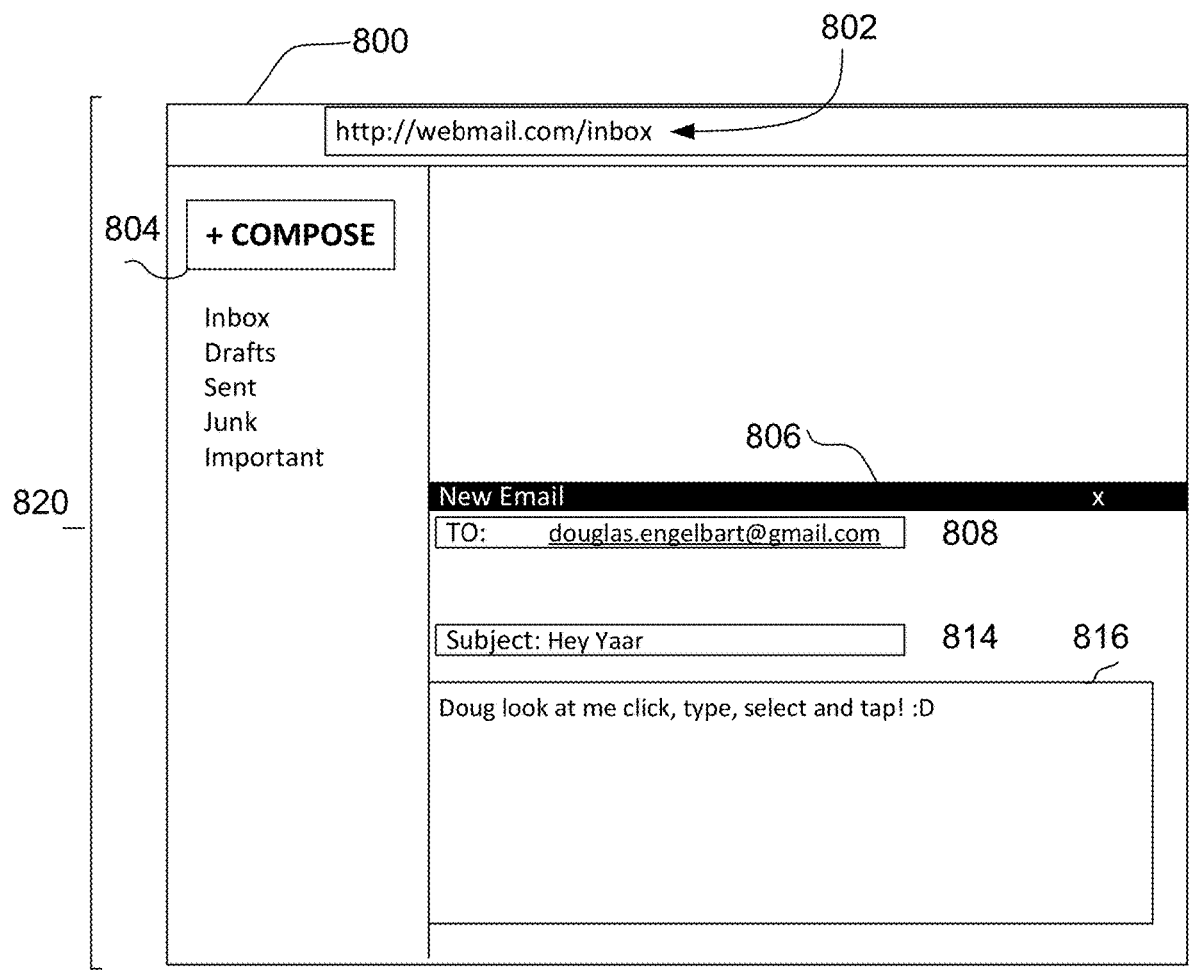
FIG. 8 illustrates an example website relative to which a new task may be recorded, according to one embodiment.

FIG. 8 is an example mock-up graphic user interface of a web browser window 800, on a specific web page made up of web elements 820, as hosted on a personal computer. Web browser window 800 could also be a web browser hosted on a smart phone or tablet device. The web page may be retrieved from web hosting server 114 responsive to user device 104 transmitting a request identifying the web page by a uniform resource locator (i.e., a "URL") 802. In the example of FIG. 8, URL 802 corresponds to a web page for a web mail client for sending email messages. As can be seen, the web page includes a compose button 804, and a new email message window 806, including a TO field 808, a subject field 814, and a message field 816. User 102 may, in interacting with browser window 800 on user device 104, request the web page identified by URL 802 and click on compose button 804 to cause new email message window 806 to pop up. User 102 may then populate TO field 808, subject field 814, and message field 816. Each of these interactions may modify the web elements in object model 320 of the web page associated with the URL 802. In operation, according to some embodiments, user 102 will populate TO field 808 and subject field 814 according to key-value pairs for a task, for example, key-value pairs 706 described in FIG. 7. According to embodiments, where web browser window 800 is rendered using a smart phone or a tablet, similar interactions with the web page will be recorded via touches on a touch screen. For example, a tap on a location on a touchscreen could be recorded as a left click in that location. In a mobile browser or a tablet browser, if the touches are on an on-screen touch keyboard, the touch screen locations would be the same as the keyboard key hit.

Each element in browser window 800 may have a position and size, as dictated by object model 320 and rendered by webview 310. Accordingly, each element may be identified having a top (vertical distance from a top-left corner of browser window 800), left (horizontal distance from a top-left corner of browser window 800), height, and width. If the webview is rendered in two dimensions (e.g., on a computer screen), some elements may be stacked in a plane on top of each other. Accordingly, individual object model elements may have overlapping positions and size. For example, message field 816 overlaps with portions of email message window 806. Based on the object model, there may be elements that are not immediately visible in browser window 800, as they are behind other elements.

Figure 8A:
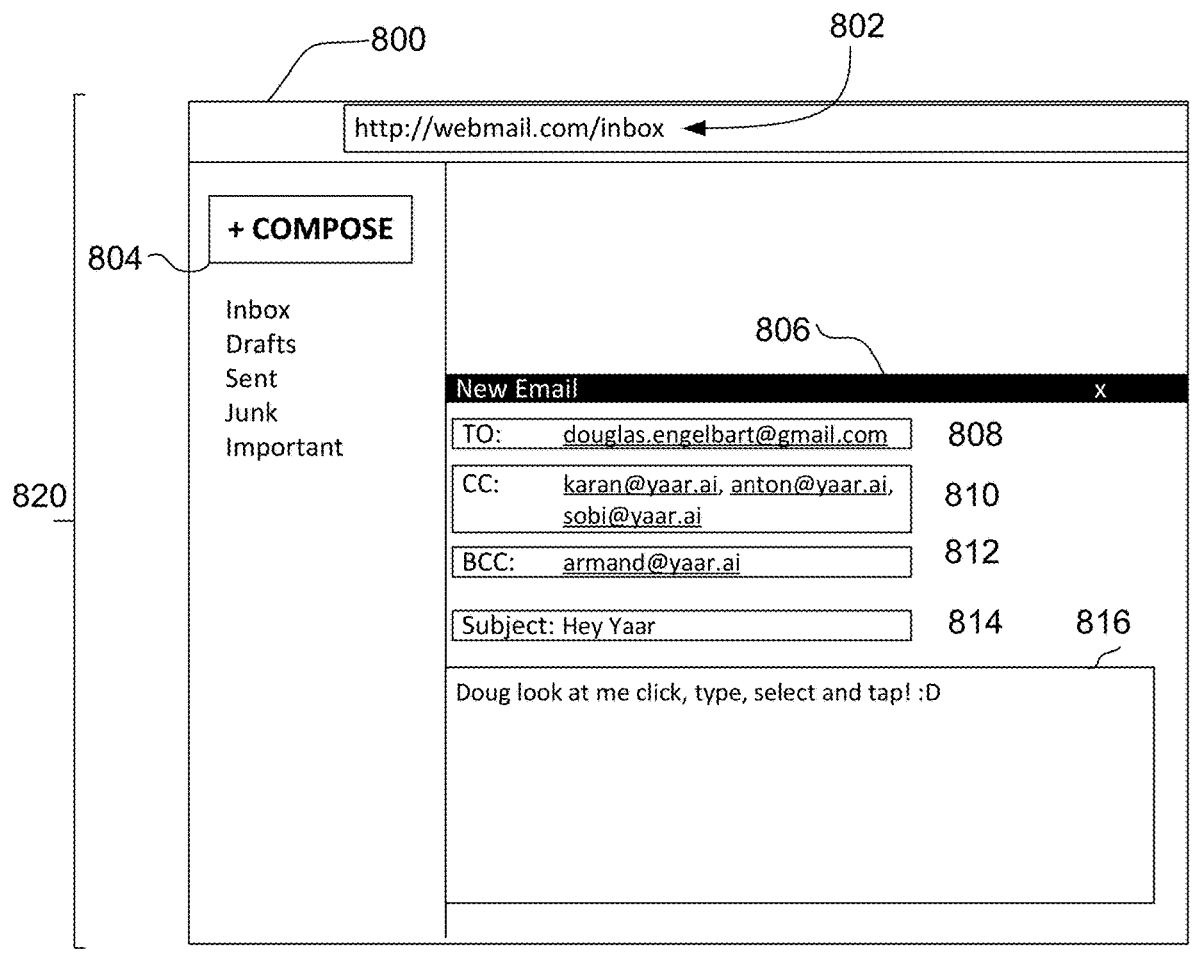
FIG. 8A illustrates an example website relative to which a new task may be recorded, according to another embodiment.

FIG. 8A is another example mock-up graphic user interface of a web browser window 800, on a specific web page made up of web elements 820, as hosted on a personal computer. This example differs from that of FIG. 8 in that the web page includes a carbon copy (CC) field 810 and a blind carbon copy (BCC) field 812. User 102 may, in interacting with browser window 800 on user device 104, request the web page identified by URL 802 and click on compose button 804 to cause new email message window 806 to pop up. User 102 may then populate TO field 808, CC field 810, BCC field 812, subject field 814, and message field 816. Each of these interactions may modify the web elements in object model 320 of the web page associated with the URL 802. In operation, according to some embodiments, user 102 will populate fields 808 to 814 according to key-value pairs for a task, for example, key-value pairs 706 described in FIG. 7.

According to embodiments where multiple recordings may be generated for performance of a single task, the entries into CC field 810 and BCC field 812 would not be present in a recording on the website as shown in FIG. 8, while they would be present in a recording in the web page of FIG. 8A.

Turning to FIG. 9, an example of a recorded performance skeleton 352 in the form of a database is shown. The recorded performance skeleton 352 is derived from the changes in the object model observed in the recording method, the actions performed on the web page, and the key value pairs as initially defined. Recorded performance skeleton 352 represents a sequential set of actions indexed in a step column 902, wherein the actions are carried out to perform the recorded task on the web page. Actions identified in an action column 908 are performed on a web element (represented by an object model xPath in an xPath column 906) of the web page are sequenced according to a recorded demonstration. In the event of a text entry into an object model element (such as for example, entering in an email address), object model processor 260 will record a key in a key column 904 and a value in a value column 905 as defined, and an index in step column 902 will dictate when each value was entered into specific object model xPath identified in xPath column 906 (i.e., the web element). Object model processor 260 will remove irrelevant components from the object models and generate recorded performance skeleton 352 representative of the sequence of actions that, taken together, perform the task.

Recorded performance skeleton 352 of FIG. 9 has been populated with example data for illustrative purposes, including key-value pairs 706 from FIG. 7. The indices in step column 902 indicate an order for sequentially carrying out actions identified in action column 908 for each object model action element identified in xPath column 906. An action in action column 908 could be a clicking action (such as a left click, a right click, a drag-and-drop, hover, scroll, a double click, a scroll, a navigation action, etc.) or a text entry action. An action in action column 908 may require an input variable from key column 904. For example, as can be seen at action having index 4 in step column 902, action in action column 908 (a text entry action) is performed on object model action element referenced in xPath column 906 with value "Body_Table_Div_EMAILADDRESS." To perform the text entry action, the input variable in key column 904 with the title "EMAIL_ADDRESS" is employed. Input variables may be provided to recording engine 250 in a natural language input, which will be described hereinafter.

Turning to FIG. 9A, an example of a conditional recorded performance skeleton 354 in the form of a database is shown. Conditional recorded performance skeleton 354 is derived from recorded performance skeleton 352. Conditional recorded performance skeleton 354 represents a sequential set of actions identified in action column 908 in indexed order specified in step column 902, where the actions are carried out to perform the recorded task on the web page. Actions identified in action column 908 performed on these web elements (represented by object model identified by xPath in xPath column 906) of the web page are sequenced according to the recorded demonstration. In the event of a text entry in to an object model element (such as for example, entering in an email address), object model processor 260 will record a key in key column 904 and a value in value column 905 as defined, and an index in step column 902 will dictate when each value was entered into specific object model xPath identified in xPath column 906 (i.e., the web element). An indication in a conditionality column 910 may be assigned to each action identified in action column 908. The indication regarding whether or not the action is a root action or a conditional action. Object model processor 260 will access recorded performance skeletons 352 in task library 222, compare the actions 908 in all recorded performance skeletons 352 corresponding to performance of the same task, and generate conditional recorded performance skeleton 354 representative of the sequence of actions that, taken together, perform the task.

Figure 10:
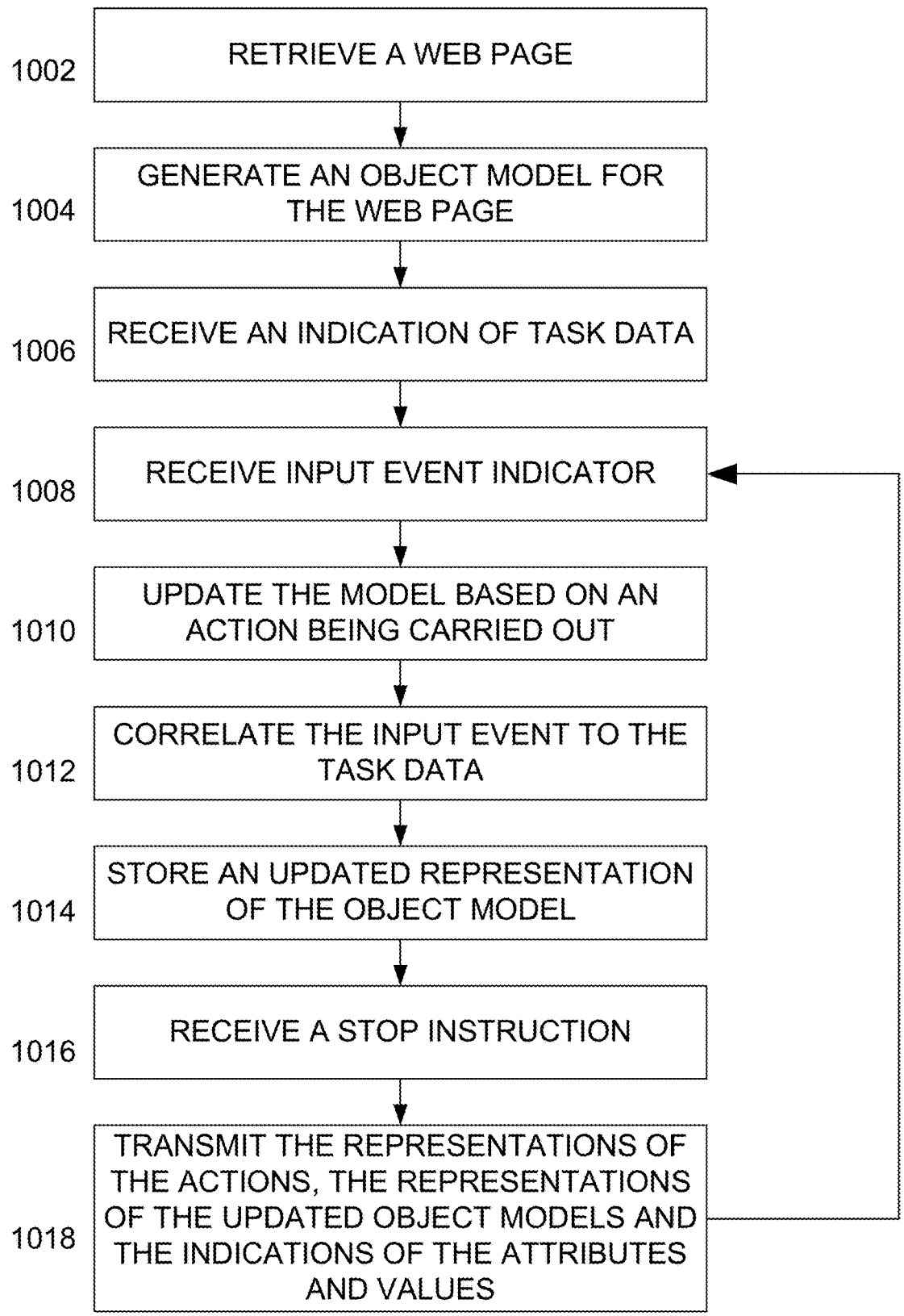
FIG. 10 illustrates example steps in a computer-implemented method of recording a task to be automated on a web page, according to one embodiment.

FIG. 10 illustrates example steps in a computer-implemented method of recording a task to be performed on a specific web page, according to one embodiment. The method may be performed by a user device, such as user device 104 in FIG. 1.

Initially, user device 104 retrieves (step 1002) the specific web page. Browser application 150 executed by processor 154 of user device 104 may generate a Hyper-Text Transfer Protocol (HTTP) request for the specific web page. The HTTP request may be received, by web hosting server 114, through web hosting server network interface 116 over a Transfer Control Protocol/Internet Protocol (TCP/IP) connection. In some embodiments, user device 104 transmits the HTTP request through network interface 152 of user device 104, over network 112 and the HTTP request is received, at web hosting server 114, through web hosting server network interface 116. In some embodiments, the HTTP request may include information about user device 104, e.g., layer 7 information and/or layer 3 information. The web page may have a plurality of elements.

Webview 310 (see FIG. 3) generates (step 1004) object model 320 of the web page. The object model 320 may be a hierarchical tree structure such as the known Document Object Model (DOM). Browser 150 has access to object model 320 and can detect changes within object model 320. Browser 150 is also able to watch for specific changes within object model 320. If object model 320 has any hierarchical labels, like classes, divs, and tags, browser 150 may categorize a structure of object model 320 based on these classes, divs, and tags.

Webview 320 next receives (step 1006) an indication of key-value pairs 700 entered on the web page. Task data or keys can include specific fields to be included in the task that is to be recorded. Attributes or values can include the data or values to be entered in the specific fields. For example, if the task is related to sending an email message, the task data or keys may include a subject field, a recipient field, and a body text field for the email message. The values or attributes would be the actual subject text, recipient, and body text of the email message to be sent.

Recording engine 250 is configured to provide a model component for demonstrations of new tasks. First, a template utterance is created consisting of key-value pairs 700 ("task data") that are characteristic of the new task. For example, if user 102 were to record an email message compose task, the template utterance may include a key "email recipient" associated with a value, "douglas.engelbart@gmail.com." The template utterance may also include a key "email message subject" associated with a value, "Hey Yaar." The template utterance may further include a key "body message" associated with a value "Doug look at me click, type, select and tap! :D" The recording process may commence responsive to the user navigating to a URL for the email message compose task and initializing a record process.

According to some embodiments, a user 102 may provide to recording engine 250 multiple recordings for a single new task. The recordings may differ in the amount of actions necessary to complete the task. For example, if a user 102 were to record a second email message compose task, the template utterance may further include a key "CC recipient" associated with a value "karan@yaar.ai, anton@yaar.ai, sobi@yaar.ai" and "BCC recipient" include associated with a value, "armand@yaar.ai". The recording process may commence responsive to the user navigating to a URL for the email message compose task and initializing a record process. This recording process, while still for composing a new email, will differ from the process as previously described, in that additional clicking and typing actions are necessary for including a CC or BCC field.

Webview 320 subsequently receives (step 1008) a notification that an input event has occurred in relation to a particular element among the plurality of elements of the web page. This notification can be generated by mutation observer 330 or an event listener bounded to specific elements of a web page. The input event may be a mouse click, a mouse scroll, a cursor hover, a double click, a scroll, a navigation action, a hold and drag action, a drag-and-drop, or a keyboard input. The notification may be received from a watcher or mutation observer 330 configured to detect the input event and, responsive to the detecting, to change a state of a variable or redirect a processor running code to a specific line of the code.

During the record process, browser 150 sends a signal to webview 320 responsible for recording the task, thereby instructing webview 320 to employ mutation observer 330 to detect any changes in initial object model 320-1. Recall that the changes are often, but not exclusively, due to input events, such as mouse clicking input events and typing input events received via user interface 158. As discussed hereinbefore, responsive to action 340 having taken place, updated object model 320-2 differs from initial object model 320-1. Put another way, a representation of initial object model 320-1 changes to become a representation of updated object model 320-2 in a manner that reflects an occurrence of action 340. Webview 310 processes updated object model 320-2 of the web page loaded from the URL and stores a representation of updated object model 320-2 in a memory. For example, the webview may store the representation of updated object model 320-2 as a JavaScript Object Notation (JSON) object.

Responsive to the receiving (step 1008) the notification, webview 310 may update (step 1010) initial object model 320-1, thereby generating updated object model 320-2. According to some embodiments, the updated object model includes the changes caused by the input event on the web page. Changes observed as initial object model 320-1 becomes updated object model 320-2 can be tracked using mutation observer 330 (see FIG. 4). Mutation observer 330 is able to watch a given object model for changes, and is able, upon observing specific changes, to generate a report that includes indications of the specific changes that have been observed.

Upon having updated (step 1010) initial object model 320-1, webview 310 may store (step 1014) a representation of the input event, a representation of updated object model 320-2, a representation of the attribute, and a representation of the element in a store or a memory. According to some embodiments, updated object model 320-2 is processed and stored as a serialized JSON object. Responsive to detecting that the user has interacted with the website such as, for example, touching on a touch screen, clicking a mouse button or typing on a keyboard (which keyboard may be implemented in software or hardware), browser 150 stores the serialized representation of action 340 and the serialized representation of object model 320-2 upon which action 340 was carried out in a memory and waits for more data from webview 310.

Webview 310 may repeatedly receive (step 1008) notifications that input events have occurred and store the updated representation of the object model (step 1014) until webview 310 receives (step 1016) a stop instruction. The receipt (step 1016) of the stop instruction will cause webview 310 to disconnect or deactivate any watchers or mutation observers. According to some embodiments, the stop instruction is received once all the fields of the task data and attributes have been given their associated attributes. According to other embodiments, the stop instruction may be received while only some of the fields of the task data and attributes have been given their associated attributes.

In accordance with aspects of the present application, user 102 finishes recording the task by signalling a stop function. According to some embodiments, this is done using the mouse to click on a stop recording button element (not shown), alternatively, this may be done by natural language query (written or verbal) or a timeout feature. According to some embodiments, browser 150 responsively signals appropriate webview 310 to remove all event listeners and disconnect from the mutation observer. Browser 150 then sends the serialized data, such as the serialized representation of action 340 and the serialized representation of updated object model 320-2, to recording engine 250.

According to some embodiments, responsive to the receiving (step 1016) the stop instruction, webview 310 transmits (step 1018), to recording engine 250, the representation of input event 340, the representation of updated object model 320-2, and an indication of the particular attribute and the indication of the associated with of the particular attribute value (i.e., the key value pair 706).

Figure 11:
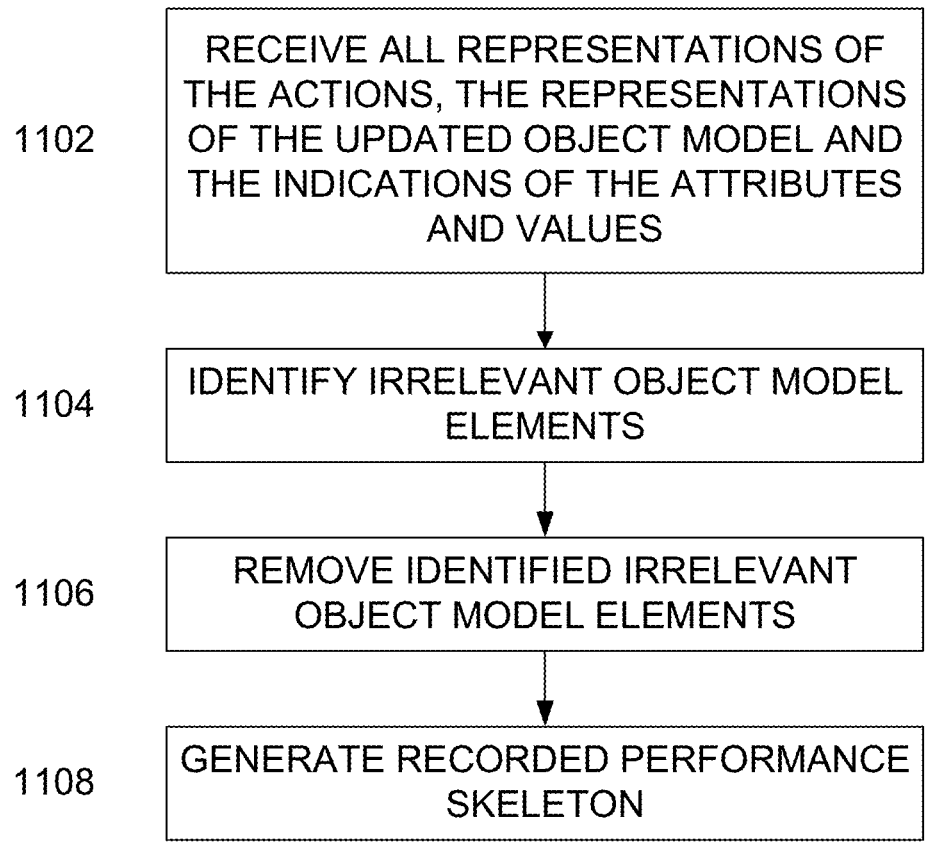
FIG. 11 illustrates example steps in a computer-implemented method of generating a recorded performance skeleton, according to one embodiment.

FIG. 11 illustrates example steps in a computer-implemented method of generating recorded performance skeleton 352, according to one embodiment. The method may be performed by object model processor 260 hosted on a recording engine, such as recording engine 250 in FIG. 2. Recording engine 250 processes the serialized data using object model processor 260, and stores recorded performance skeleton 352 in task database 222. Recorded performance skeleton 352 may take the form of a database, as shown in FIG. 9.

Initially, object model processor 260 will receive (step 1102) all representations of the actions, the representations of the updated object models and the indications of the attributes and values. According to some embodiments, these representations and indications can be generated by headless browser 219 and transmitted according to the method as described in FIG. 10.

Object model processor 260 will then identify (step 1104) irrelevant object model elements. Irrelevant object model elements may be identified using pre-defined rules, wherein certain branches have been identified as not relating to web elements related to performance of a task. These rules may be implemented using attributes of the HTML elements in the recording, such as divs, classes, tags, aria-labels, the content of the website or any value associated with the individual web element. According to some embodiments, object model processor may remove duplicated object models stored in a series, such as, for example, those identical object models corresponding to a click action followed by a typing action. These click actions may be classified by object model processor 260 as corresponding to the same action.

Once irrelevant object models have been identified (step 1104), these objects are removed (step 1106). Object model processor 260 will remove the elements from memory, or alternatively generate a new memory object only including those elements leftover from this step. Thereby, a pared-down version of the representations of the updated object models as received containing only pertinent data for eventual playback.

Finally, recorded performance skeleton 352 is generated (step 1108). Recorded performance skeleton 352 can take the form as shown FIG. 9. This data structure includes an indexed list of interactions in order 902, object model xPath 905, and action 908 performed on the web element. Further, the specific key-value pairs associated with each step in the indexed list of interactions is included. Recorded performance skeleton 352 can eventually be used, by performance controller 223 of playback engine 210, in the performance of modified tasks similar to, and based on the recorded task.

Figure 11A:
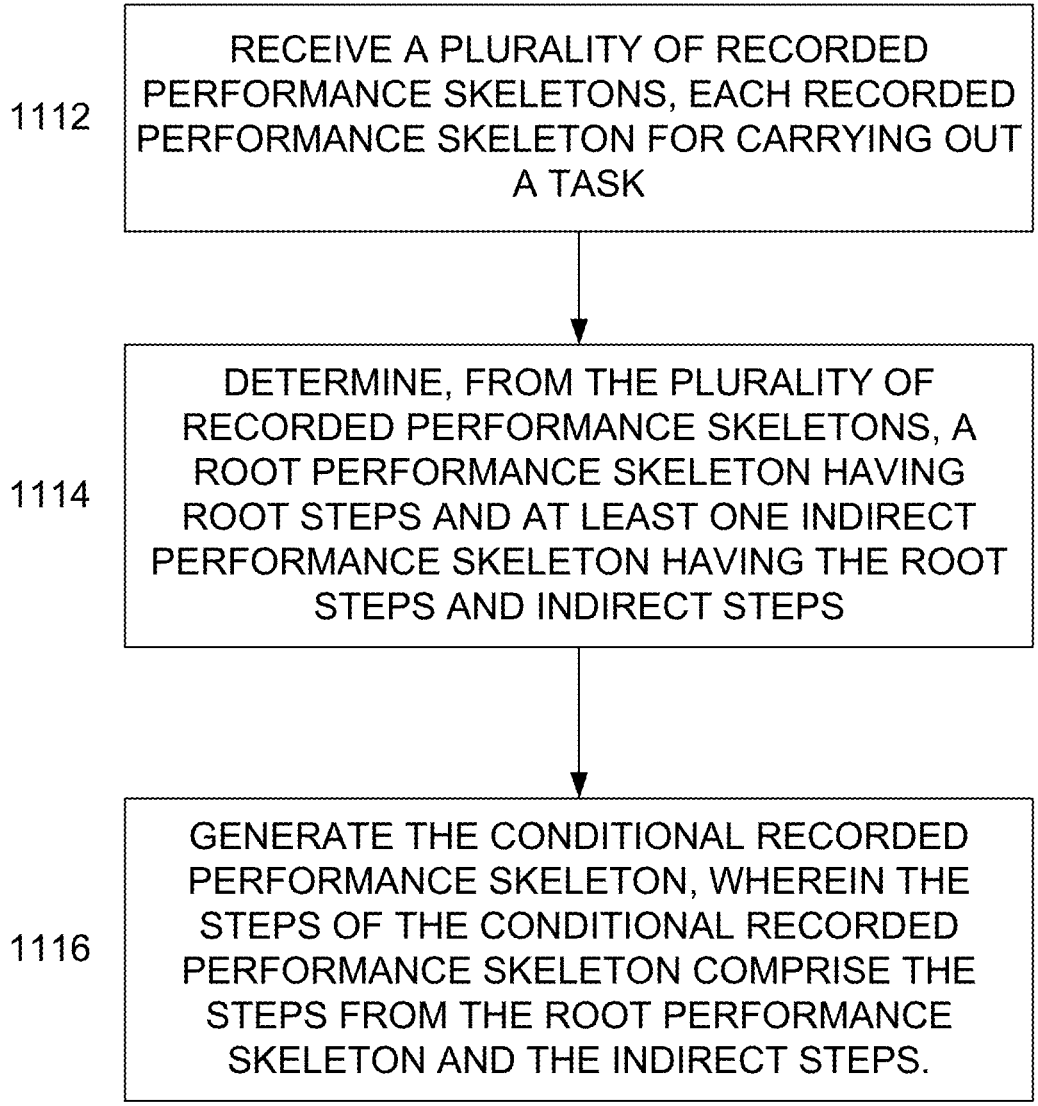
FIG. 11A illustrates example steps in a computer-implemented method of generating a conditional recorded performance skeleton, according to one embodiment.

FIG. 11A illustrates example steps in a computer-implemented method of generating conditional recorded performance skeleton 354, according to one embodiment.

At step 1112, a plurality of recorded performance skeletons 352 is received by object model processor 260. Recorded performance skeletons 352 may be stored in template library 222 and generated using the method as described in FIG. 11. Each recorded performance skeleton 352 received may be for performance of the same task, however the actions in each recorded performance skeleton 352 may be different.

At step 1114, a root recorded performance skeleton having root action and at least one indirect recorded performance skeleton having the root actions and indirect actions are determined by object model processor 260. The root recorded performance skeleton may be the one recorded performance skeleton 352 having the fewest actions (rows in recorded performance skeleton 352) to perform the task. The actions in action column 908 of the root recorded performance skeleton are considered to be root actions, i.e., necessary for performance. The indirect recorded performance skeletons may have the same root actions, but may further include additional actions, known as indirect actions. These indirect actions may be related to optional actions in task performance, or may be reactive to changes in object models in task performance that may not occur across every performance. For example, inclusion of a BCC recipient in a email, and closing a pop up window, would both be considered indirect actions. Accordingly, object model processor 260 may compare the number of actions in each received recorded performance skeleton 352, and determine the one having the fewest actions to be the root recorded performance skeleton. The actions in all other received recorded performance skeleton 352 not present in the root recorded performance skeleton can be considered to be indirect actions.

At step 1116, conditional recorded performance skeleton 354 is generated by object model processor 260, wherein the actions of conditional recorded performance skeleton 354 comprise the root actions from the root recorded performance skeleton and the indirect actions from each indirect recorded performance skeleton. Conditional recorded performance skeleton 354 may take a structure similar to that illustrated in FIG. 9A, wherein there are actions in an order indexed in a step column 902, and wherein indirect actions include an "indirect" indication in conditionality column 910. Based on a conditionality being met, conditional recorded performance skeleton 354 will indicate the appropriate action 908 to take. As can be recognized and will be described in relation to later figures, conditionality may be based on an update message, or a specific user input.

In overview, aspects of the present application relate to performing a task on a web page. Performance controller 223 is responsible for causing performance of a given task on a headless browser 219. Playback engine 210 may receive an indication of task data, wherein the task data has a plurality of attributes (such as an email recipient, a subject message, body message, etc.). Playback engine 210 may also receive, user device 104, cookies relating to user credentials so that performance controller 223 may operate one or more instances of headless browsers that act as if they were executed on user device 104.

Figure 12:
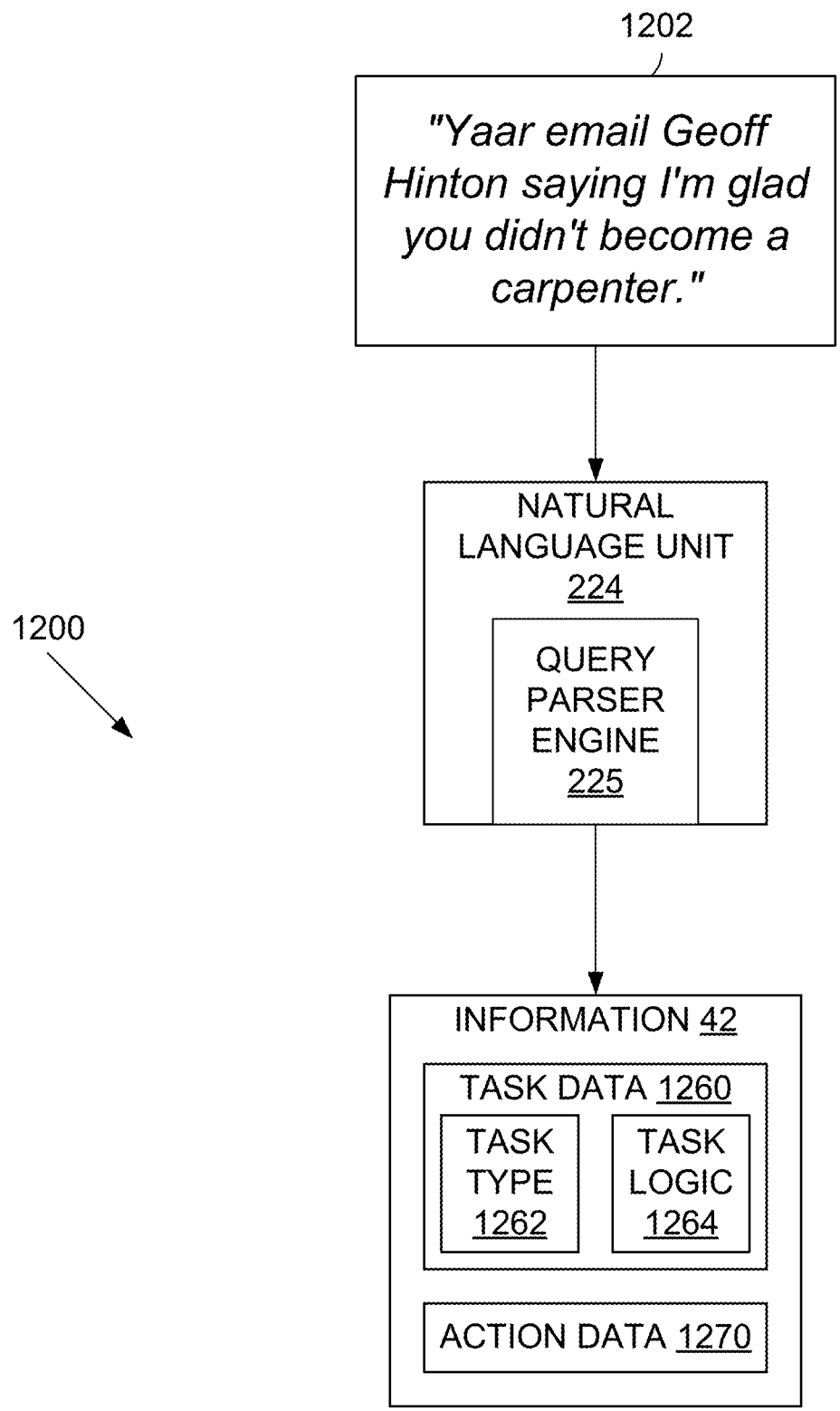
FIG. 12 illustrates a natural language unit operable to determine a task to perform on a web page, according to one embodiment.

FIG. 12 illustrates receipt, by natural language unit 224, implemented by playback engine processor 214 (see FIG. 2), of a natural language input 1202.

According to some embodiments, natural language unit 224 receives natural language input 1202 from user 102. Natural language input 1202 is expected to be indicative of a task to be carried out on one or more web pages. Natural language input 1202 may include instructions for specific actions to be carried out within the task. For example, while a "send an email" task includes a recipient, the task may not necessarily include a BCC recipient. Accordingly, natural language input 1202 may include instructions for conditional actions via an extra set of key-value pair associated to a specific conditional action to be carried out as part of performance of the task. Natural language unit 224 includes a query parser engine 225 that is configured to derive, from natural language input 1202, information 42 about the task to be carried out. Information 42 may include specific task data 1260, such as a task type 1262 and a task logic 1264 for use in various decision-making processes, along with action data 1270 related to individual actions that are to occur during the carrying out of the task. Task type 1262 may be indicative of the type of task to perform, i.e., specific recorded performance skeleton 352 to use in performing the task. Task logic 1264 be used in the case where natural language input 1202 includes multiple tasks to perform, indicating how the multiple tasks should be carried out, identifying a final end task (for example, how/if a calendar event should be scheduled based on the response to an email) if decisions should be made in automation. Action data 1270 may include specific variables to be used for the task. Action data 1270 may not include all variables associated with a conditional recorded performance skeleton 354. If the missing variables relate to an indirect action, the indirect action would not be carried out. However, if the missing variables relate to a root action, according to some embodiments, natural language unit 224 may cause a query to be sent to user device 104, the query indicating that additional information is required. The query indicating that additional information is required may be accomplished by playback engine 210 causing a VNC display to be rendered upon a WebView on user device 104.

According to some embodiments, for some ambiguous natural language inputs, natural language unit 224 can first attempt to narrow down a target task using an internal knowledge base. The internal knowledge base may be used to interpret specific elements within the natural language input (such as, for example, knowing that "my office" refers to a specific address). The knowledge base may also be used to determine the most appropriate suggestions to be presented to a user (for example, if asked to find a coffee shop, using locational data to find those close to the user based on a stored location). Natural language unit 224, if instructed, will search the web to look for resources and references related to the entity. Natural language unit 224 can also, in some cases, present user 102 with a plurality of structured input options from which a single structured input may be selected.

According to some embodiments, included with natural language input 1202 are any cookies on browser 150 of user device 104 associated with the web page.

Once information 42 has been extracted from natural language unit (NLU) 224, playback engine 210 generates headless browser 219 containing the cookies from browser 150. As an example, natural language input 1202 may be "Schedule a meeting with Carl for tomorrow at 5 pm." The query parser engine 225 may be configured to take this natural language input 1202 and output information 42 that includes the end task to be carried out as "schedule a calendar event," with further details including the intent scheduler, recipient: "carl", time: "tomorrow at 5 pm."

Within a "schedule a calendar event" recorded performance skeleton 352, NLU 224 may be configured to recognize that recorded performance skeleton 352 includes values that can be used to fill spots in value column 905 using task data 1260, such as an email address for a recipient. NLU 224 may then search (via a database query) within a contacts database associated with user 102 for a contact database entry with name "carl" and, thereby, determine whether a contact database entry exists associated with a first name that is, or begins with, "carl".

Performance controller 223 first transmits an instruction to instruct browser 150 to retrieve a web page identified by the URL associated with the "schedule a calendar event" playback performance skeleton 1400. Headless browser 219, using cookies from user device 104, waits for the file representative of the web page to be received. Headless browser 219 is then instructed, by performance controller 223, to listen for object model changes using a mutation observer having similar functionality to that described hereinbefore in relation to recording. Headless browser 219 generates initial object model 320-1 and stores initial object model 320-1 in memory accessible to performance controller 223 or any other function of processor 214. Playback engine 210 then stores its own version of initial object model 320-1 in playback engine memory 221.

Performance controller 223 analyzes received initial object model 320-1 and uses a playback performance skeleton 1400 (see FIG. 14) based on recorded performance skeleton 352 in task database 222 as a reference to send back an indication of an appropriate action to perform. Headless browser receives the indication to perform action 340 and waits for object model 320 to finish updating before indicating, to performance controller 223, that action 340 has been performed.

Once performance controller 223 receives confirmation that action 340 has been performed, performance controller 223 sends, to headless browser 219, a message that includes a request for an indication of the changes in object model 320 that this action caused. Headless browser 219 replies with changes in object model 320. Upon receipt of the changes, performance controller 223 updates the working memory of the object model 320, thereby leading to updated object model 320-2.

The performance controller 223 then uses updated object model 320-2 and task database 222 to initiate a next action. This process repeats until there are no more actions to be performed to complete the task. If next action in action column 908 identified by the index in step column 902 has an indication, in conditionality column 910, specifying that the next action is a root action, the next action will be executed. If the next action has an indication, in conditionality column 910, specifying that the next action is an indirect action, then the next action will be executed if a conditionality is met. Once there are no more actions to be performed, performance controller 223 sends a task complete signal to headless browser 219 and closes all the connections.

According to some embodiments, playback engine 210 may use a VNC protocol to establish a connection from playback engine 210 to user device 104 in task performance. The VNC connection may be used fully or partially during playback performance. A VNC connection may allow for a user to interfere/terminate a task in certain scenarios, such as involving monetary decisions or requiring additional input, e.g., booking a ride on Uber™ or choosing from among potential dates for a calendar event. In one such scenario, an example recorded performance skeleton may include, as a final action, a click on the "Request Uber" button in a user interface. During the playback phase, if a user requests a ride during rush hour, playback engine 210 may detect that the web page includes a description stating that fare prices have surged. In such a scenario, the recorded performance skeleton may be configured to alert the user and establish a VNC connection to display the object model as stored and updated in headless browser 219. An alert may be in the form of a push notification. The VNC client at the user device may render, on the user device, the object model thereby allowing the user to view the fare prices and interact with the user device to perform the final action. That is, the final action in this scenario may be performed by the user to select a certain fare, or abandon task performance altogether.

According to some embodiments, responsive to performance controller 223 failing to find a geometrically compatible DOM element to the DOM element specified in xPath column 906 of the recorded performance skeleton, playback engine 210 may request user intervention using a visually displayed front-end that is rendered, at user device 104, by a VNC client.

According to some embodiments, the action and the next action may be performed on different web pages. This allows for the playback of tasks that may require "switching tabs" if the tasks were to be performed without the use of aspects of the present application. For example, aspects of the present application may allow for the generation of a calendar event on a calendar web page open in one tab on the basis of content in an email message received in an email inbox web page open in another tab. According to these embodiments, multiple headless browser instances may be employed for task performance, wherein each headless browser instance may relate to a different web page.

Figure 13:
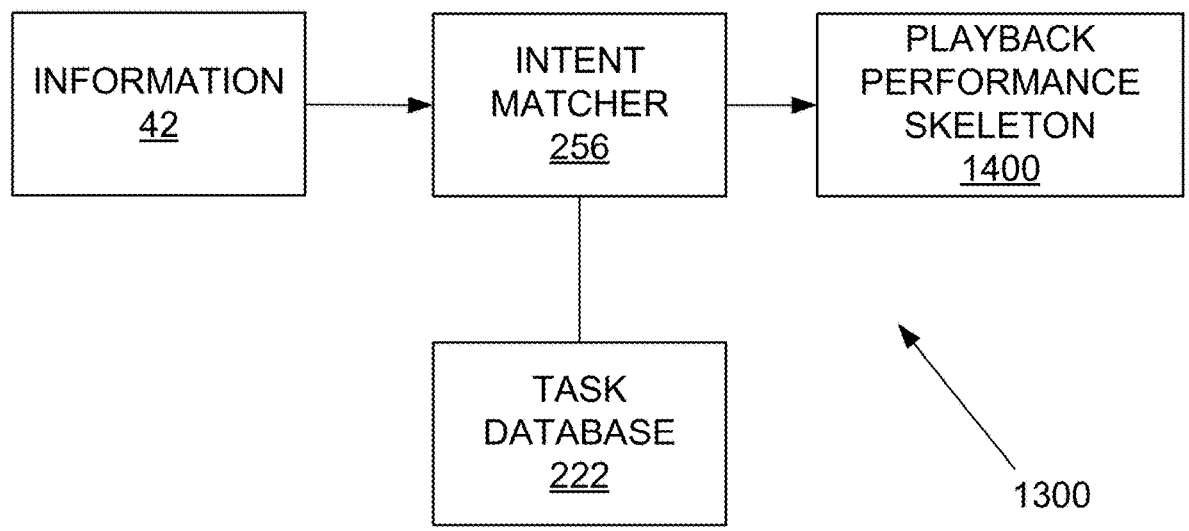
FIG. 13 illustrates a model including an intent matcher to generate a playback performance skeleton, according to one embodiment.

FIG. 13 illustrates a model 1300 including intent matcher 256 (FIG. 2) implemented by playback engine processor 214 (FIG. 2). Information 42 (see FIG. 12) is provided to intent matcher 256 having access to task database 222. Task database 222 stores recorded performance skeleton(s) 352 and conditional recorded performance skeletons 354. Recorded performance skeleton 352 is derived, by object model processor 260 (FIG. 6), from changes 602 to object model 320 and associated actions 340 using, for example, the method described in FIG. 11. Conditional recorded performance skeleton 354 is derived, by object model processor 260, from recorded performance skeletons 352 using, for example, the method described in FIG. 11A. Based on information 42 and recorded performance skeleton 352 or conditional recorded performance skeleton 354, intent matcher 256 determines recorded performance skeleton 352 associated with information 42, and then generates playback performance skeleton 1400. Playback performance skeleton 1400 is used as an instructional guide for determining how to perform an action in a web page in playback.

FIG. 14 illustrates an example playback performance skeleton 1400, according to one embodiment. Playback performance skeleton 1400 is in the form of a table and is populated with example data for illustrative purposes. Playback performance skeleton 1400 is generated by intent matcher 256 using information 42 derived from natural language input 1202 and a recorded performance skeleton 352 or a conditional recorded performance skeleton 354. Playback performance skeleton 1400 includes the same information as recorded performance skeleton 352: indices in a step column 902; keys in a key column 904 with corresponding values in a value column 905; object model xPaths in an xPath column 906; and the action to take in an action column 908. Intent matcher 256 will replace values in the value column 905 with those extracted from information 42. According to some embodiments, playback performance skeleton 1400 will dictate the action messages and next action messages sent from performance controller 223 to headless browser 219.

Performance controller 223 is configured to generate an action message based on the playback performance skeleton 1400 and object models of the web page upon which the task is to be performed. For each action performed in the order as dictated by indices in step column 902, performance controller 223 will generate an action message to send to headless browser 219. According to some embodiments, the headless browser 219 and performance controller 223 of playback engine 210 are separate services bridged together by a websocket communication channel. An action message can include the type of action to perform (i.e., clicking, typing, etc.), the xPath of the object model on which to perform the action and any additional operational parameters from values in value column 905 (i.e., if the action is a typing action, the specific text to type in the object model identified by the xPath). Headless browser 219 may, responsive to receipt of an action message, perform an action on the webpage, simulating a user's use of keyboard and mouse for typing and clicking actions, respectively. According to some embodiments, the typing and clicking actions may be performed at headless browser 219 in a window not shown on a screen, as is conventional for headless browsers.

According to some embodiments, selection of the object model upon which to perform the action may be accomplished using an algorithm to determine web element similarity. The algorithm may involve a vectorization analysis and/or geometry analysis to determine the specific web element having an xPath on a new web page having the greatest similarity to a known element on a known webpage, as will be described hereinafter.

Responsive to performance of the action by headless browser 219, headless browser 219 will send an update message to performance controller 223. The update message may include a complete or truncated representation of the object model of the web page after the action has been performed. Performance controller 223 will then determine the next action message to send back to headless browser 219. The determining may be based on the update message and possible next action according to indices in step column 902 in playback performance skeleton 1400. Similar to the first action message as previously described, the next action message may include the type of action to perform (e.g., clicking, typing, etc.), the xPath of the object model on which to perform the next action, and any additional operational parameters from values in value column 905 (i.e., if the next action is a typing action, the specific text to type in the object model identified by the xPath). Headless browser 219 may, responsive to receipt of a next action message, perform the next action on the webpage, simulating a user's use of keyboard and mouse for typing and clicking actions, respectively.

According to some embodiments, as shown in FIG. 14A, a conditional playback performance skeleton 1400A may be generated by intent matcher 256 using information 42 derived from natural language input 1202 and a conditional recorded performance skeleton 354. This conditional playback performance skeleton 1400A may further include indirect actions dictated by user input and may, additionally, include specific actions to follow if a conditionality is met (such as, for example, closing a pop-up window if the pop-up window is generated on headless browser 219). The actions each have an indication, in conditionality column 910, associated therewith. The indication may be determined or modified from conditional recorded performance skeleton 354 from natural language input 1202. For example, if natural language input 1202 from user 102 dictated a BCC recipient for an email message, the indication for performance would be modified, by intent matcher 256, to ROOT.

According to embodiments where the playback performance skeleton is conditional playback performance skeleton 1400A, determination of an action message and a next action message may be accomplished by assessing the indication, in conditionality column 910, for the specific action at a given index in step column 902. If the indication specifies that the specific action is an indirect action, an action message may only be sent to headless browser 219 upon determining that a specific object model xPath relating to the indirect action is found in the object model of the web page for performance or is found in an update message. If the indication, in conditionality column 910, specifies that the specific action is a root action, performance controller 223 will send an action message for action performance.

Figure 15:
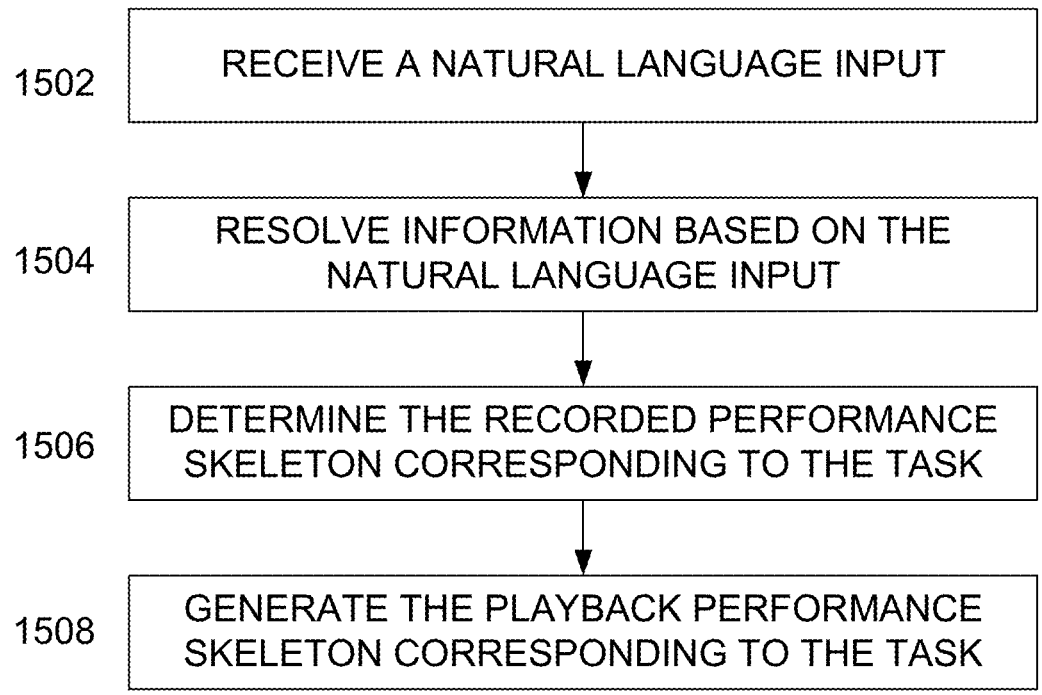
FIG. 15 illustrates example steps in a computer-implemented method of generating a playback performance skeleton, according to one embodiment.

FIG. 15 illustrates example steps in a method of generating playback performance skeleton 1400 for a task on a web page, according to one embodiment.

Initially, natural language input 1202 is received (step 1502). Natural language input 1202 could be a text input through a chat window or may be a voice input converted to text using speech-to-text algorithms. Natural language input 1202 may be indicative of a task to be performed and may include information specifying details of the performance of the task.

Natural language processor 224 resolves (step 1504) information 42 about the task based on natural language input 1202. Resolving (step 1504) the task can include resolving the intent of the task (including the relevant specific information necessary for performance of the task) but can also include resolving missing or ambiguous task related attributes. For example, it may be resolved (step 1504), from information 42, that the task is related to sending an email message. The specific email message body text and email recipients may also be resolved (step 1504). Based on natural language input 1202, natural language processor 224 can resolve whether specific indirect actions are to be included in the task performance. For example, if natural language input 1202 includes a reference to adding a BCC recipient on an email message, natural language processor 224 will determine that an action related to adding a BCC recipient should be included in task performance.

Recorded performance skeleton 352 corresponding to the task is then selected (step 1506). According to embodiments where multiple recordings have been generated for a task performance, conditional recorded performance skeleton 354 may, alternatively, be selected. This selecting may be accomplished, in part, by comparing the information 42 to plural recorded performance skeletons stored in task database 222, then selecting the recorded performance skeleton or conditional recorded performance skeleton that most closely fits the task, as resolved from natural language input 1202 received in step 1502.

Finally, a playback performance skeleton, corresponding to the task and natural language input 1202, is generated (step 1508). The playback performance skeleton is of the same form as the selected recorded performance skeleton (step 1506), with the addition of the information as resolved in step 1504 to perform the task. According to embodiments where a conditional recorded performance skeleton 354 is to be selected, conditional playback performance skeleton may include information relating to the conditionality of specific actions based on the natural language input 1202.

Figure 16:
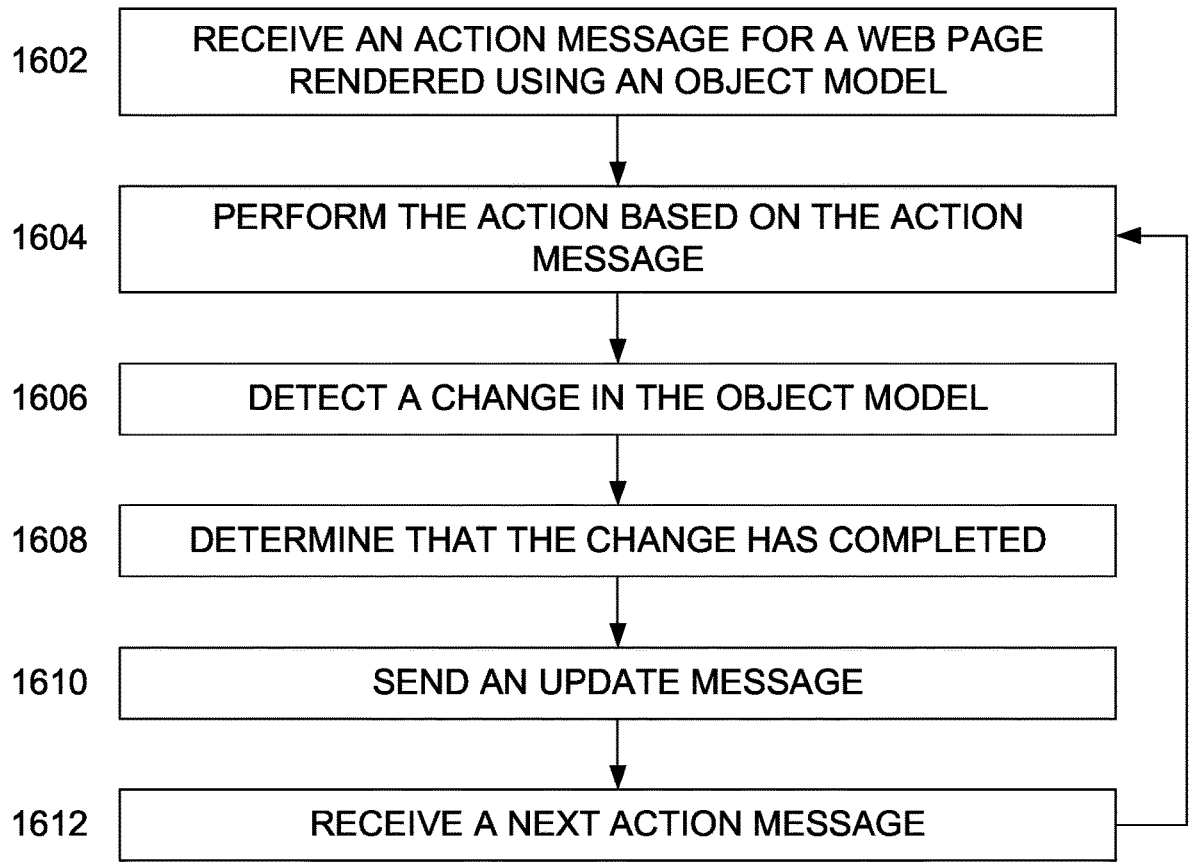
FIG. 16 illustrates example steps in a method of executing a task on a web page, according to one embodiment.

FIG. 16 illustrates example steps in a method of executing a task on a web page, according to one embodiment. The task is made up of actions and the web page is rendered by headless browser 219 using an object model. According to embodiments where the conditional playback performance skeleton is based on a conditional recorded performance skeleton, actions may be root actions or indirect actions.

Headless browser 219 receives (step 1602), from performance controller 223, an action message. The action message includes instructions causing headless browser 219 to perform an action on the web page. The action may be, for a few examples, a mouse click, a mouse scroll, a mouse cursor hover, a double click, a scroll, a navigation action, a hold and drag action, a drag-and-drop, or a keyboard input, simulating what would have been an input event from user 102 interacting with user interface 158 of user device 104.

Responsive to receiving (step 1602) the action message, headless browser 219 performs (step 1604) the action on the web page. The performance of this action can cause a change in the object model. As discussed hereinbefore, the object model may be a hierarchical tree structure rendering of a web page like the known DOM.

Subsequent to the performing (step 1604) of the action, headless browser 219 detects (step 1606) a change in the object model. The change may be detected by mutation observers configured to observe changes that have taken place in the object model and to record in which elements of the object model the changes have taken place. According to some embodiments, the change detected in the object model may be caused indirectly by the action performed. For example, if the action was "send an original email message," one of the mutation observers may detect that the compose email button was clicked and, subsequently, a new window was opened up in headless browser 219.

Headless browser 219 next detects (step 1608) that the change in the object model has been completed. According to some embodiments, the change in the object model may be detected (step 1608) as having been completed after multiple changes in the object model have occurred. For example, if, in response to the action, multiple new elements have been generated in the web page and, consequently, in the object model of the web page, the change may not be considered to have completed occurring until each of the changes in the object model are complete.

Responsive detecting (step 1608) that the change in the object model has been completed, headless browser 219 transmits (step 1610), to performance controller 223, an update message containing an indication of the change in the object model caused by the performing the action. Performance controller 223 may then determine, based on the update message, a possible next action according to the indices in step column 902 in playback performance skeleton 1400. Performance controller 223 may then determine, based on the possible next action, a next action message to send to headless browser 219.

In a manner consistent with the receiving (step 1602) the action message, headless browser 219 receives (step 1612), from performance controller, the next action message. The next action message may, for example, contain instructions for headless browser 219 to perform a next action on the web page. Performance controller 223 may base the next action message on the indication of the change in the object model and the task data previously defined in the recording steps or stored in a recording library.

According to some embodiments, the next action message may be determined by performance controller 223 based on a conditionality. For example, if conditional playback performance skeleton 1400A is derived from conditional recorded performance skeleton 354, and if the conditionality for an indirect action is met, the action associated with the meeting of the conditionality being met may be selected as the next action.

For clarity, consider that the playback performance skeleton has a indirect action relating to closing a pop-up window. On the one hand, consider that the update message indicates that a pop-up window has been rendered in the object model. Playback engine 210 may determine that a conditionality specifying an open pop-up window has been met and that the next action message may include instructions for closing the pop-up window. On the other hand, consider that the update message does not indicate that a pop-up window has been rendered in the object model. Playback engine 210 may determine that the conditionality specifying an open pop-up window has not been met and that, accordingly, there is no cause for sending instructions for closing a pop-up window.

As can be seen, the steps of performing the action (step 1604) through to, and including, receiving a next action message (step 1612) may be iterated and repeated as headless browser 219 performs each action as ordered in playback performance skeleton 1400 until all of the actions in playback performance skeleton 1400 are performed.

Figure 17:
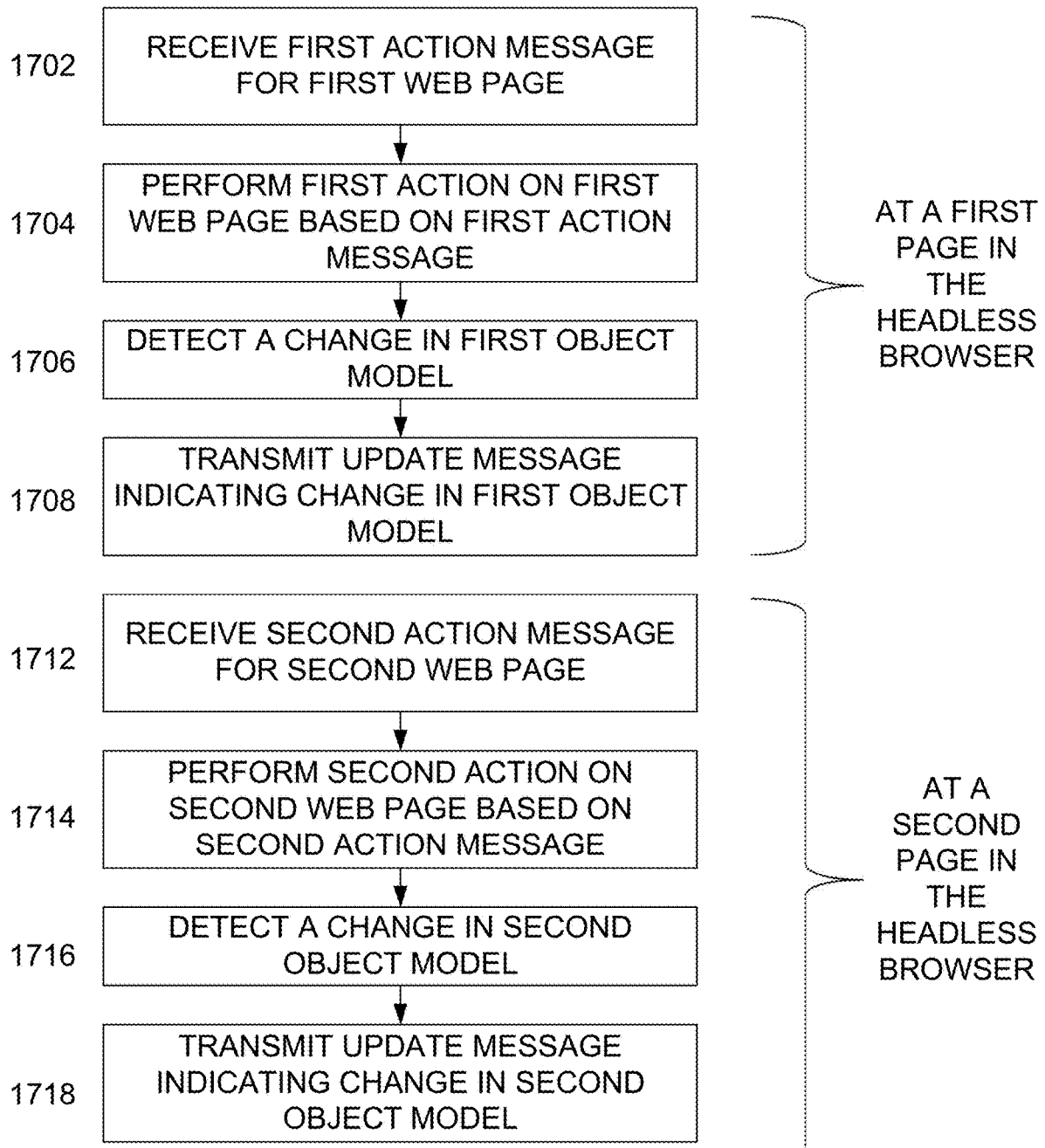
FIG. 17 illustrates example steps in a method of executing a task across two web pages, according to one embodiment.

FIG. 17 illustrates example steps in a method of executing a task as two sub-tasks, wherein each sub-task is performed one of a first web page and a second web page, according to one embodiment. According to some embodiments, the first web page and the second web page may both be accessed using the same headless browser instance. According to other embodiments, multiple headless browsers may be employed.

A headless browser receives (step 1702) a first action message. The first action message includes instructions causing the first headless browser to perform a first action on the first web page. The first action may be a mouse click, a mouse scroll, a mouse cursor hover, a drag-and-drop, or a keyboard input, simulating what would have been an input event from user 102 interacting with user interface 158 of user device 104.

Responsive to receiving (step 1702) the first action message, the headless browser performs (step 1704) the first action on the first web page. The performance of the first action can cause a change in a first object model corresponding to the first web page. As discussed hereinbefore, the first object model may be a hierarchical tree structure rendering of the first web page like the known DOM.

Subsequent to the performing (step 1704) of the first action, the headless browser detects (step 1706) a change in the first object model. The change may be detected by mutation observers configured to observe changes that have taken place in the first object model and in which elements of the first object model the changes have taken place. According to some embodiments, the change detected in the first object model may be caused indirectly by the performance of the first action. For example, if the first action was "send an original email message," one of the mutation observers may detect that once the compose button was clicked, a new window was opened within the first headless browser.

The headless browser next detects that the change in the first object model has been completed. According to some embodiments, the change in the first object model may be detected (step 1706) as having been completed after multiple changes in the first object model have occurred. For example, if, in response to the performance (step 1704) of the first action, multiple new elements have been generated in the first web page and, consequently, in the first object model of the web page, the change may not be considered to have completed occurring until each of the changes in the first object model are complete.

Responsive to detecting (step 1706) that the change in the first object model has been completed, the headless browser transmits (step 1708), to performance controller 223, an update message containing an indication of the change in the first object model caused by the performing (step 1704) of the first action.

In a manner consistent with the receiving (step 1702) the first action message, the headless browser receives (step 1712) a second action message. The second action message may, for example, contain instructions for the headless browser to perform a second action on the second web page. Performance controller 223 may base the second action message on the indication of the change in the first object model or on the first action. The second action message may also be a sequential action based on the task data previously defined in the recording steps or stored in a recording library.

Responsive to receiving (step 1712) the second action message, the headless browser performs (step 1714) the second action on the second web page. The performance of the second action can cause a change in a second object model corresponding to the second web page. As discussed hereinbefore, the second object model may be a hierarchical tree structure rendering of the second web page like the known DOM.

Subsequent to the performing (step 1714) of the second action, the headless browser detects (step 1716) a change in the second object model. The change may be detected by mutation observers configured to observe changes that have taken place in the second object model and in which elements of the second object model the changes have taken place.

The headless browser next detects that the change in the second object model has been completed. According to some embodiments, the change in the second object model may be detected (step 1716) as having been completed after multiple changes in the second object model have occurred.

Responsive to detecting (step 1716) that the change in the second object model has been completed, the headless browser transmits (step 1718), to performance controller 223, an update message containing an indication of the change in the second object model caused by the performing (step 1714) of the second action.

According to some embodiments, the second action message may be determined, by performance controller 223, based on a conditionality in a conditional playback performance skeleton. For example, if the conditional playback performance skeleton is derived from a conditional recorded performance skeleton and the conditionality for an indirect action is met, the action associated with meeting the conditionality may be the second action.

However, in the present example, the first action message and the second action message include information about actions to be performed on the first web page and the second web page, respectively. For example, based on the receipt, detected on an email inbox management web page, of a response to an email message, performance controller 223 may generate the second action message such that the second action message indicates that the second action is to be performed in a calendar web page (the second web page).

Figure 18:
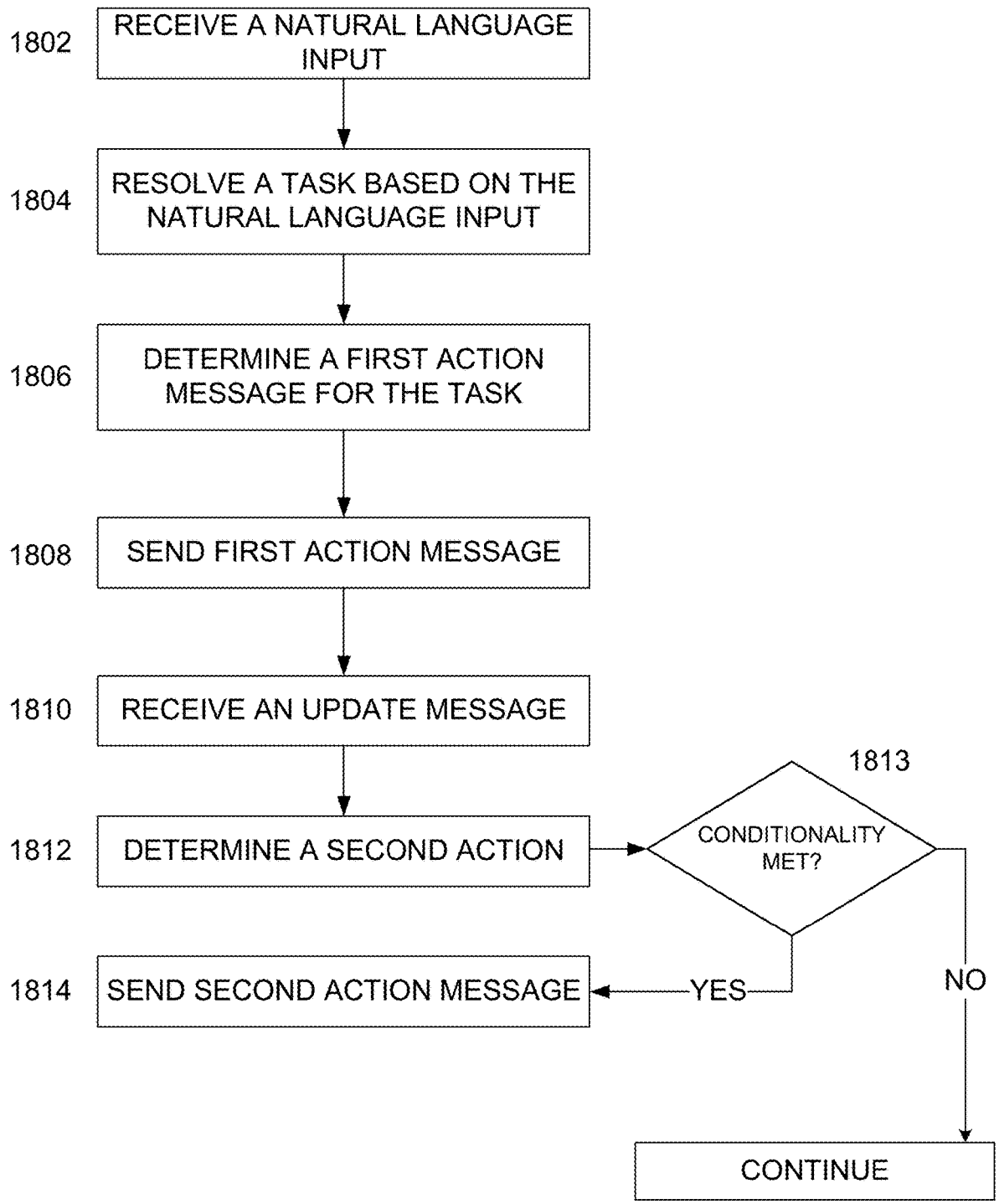
FIG. 18 illustrates example steps in a method of executing a task on a web page based on a natural language input, according to one embodiment.

FIG. 18 illustrates example steps in a method of executing a task on a web page based on natural language input 1202, according to one embodiment.

Initially, the natural language processor 224 receives (step 1802) natural language input 1202. Natural language input 1202 could be a text input through a chat window or may be a voice input converted to text using speech-to-text algorithms. Natural language input 1202 may be indicative of a task to be performed and may include information specifying details of the performance of the task.

Natural language processor 224 resolves (step 1804) the task based on natural language input 1202. Resolving (step 1804) the task can include resolving the intent of the task but can also include resolving missing or ambiguous task related attributes. According to some embodiments, natural language processor 224 may resolve missing or ambiguous task-related attributes relating to indirect actions from an identified conditional recorded performance skeleton 354 in task database 222.

Performance controller 223 determines (step 1806) an action message based on the playback performance skeleton 1400. If the action is not the first action performed the order indicated by indices in step column 902, the action message may be further based on an update message. The action message includes instructions causing headless browser 219 to perform an action on the web page. The action may be a mouse click, a mouse scroll, a mouse cursor hover, a drag-and-drop, or a keyboard input, simulating what would have been an input event from user 102 interacting with user interface 158 of user device 104. According to some embodiments, a server hosting performance controller 223 sends (step 1808) the action message.

Subsequent to playback engine 210 sending (step 1808) the action message indicating a specific action, headless browser 219 performs the specific action on the web page. The performance of the specific action can cause a change in the object model. As discussed hereinbefore, the object model may be a hierarchical tree structure rendering of a web page like the known DOM.

Subsequent to the performing of the specific action, an update message is received (step 1810) from headless browser 219 regarding a change in the object model. The change may be detected mutation observers 330 (see FIG. 3) configured to observe changes that have taken place in the object model and in which elements of the object model the changes have taken place. According to some embodiments, the change detected in the object model may be caused indirectly by the action performed. For example, if the action was "send an original email message," one of the mutation observers may detect that a response email message to the original email message has been received.

Performance controller 223 next determines (step 1812) a second action to be performed, based on the change in the object model and the playback performance skeleton. According to some embodiments, the change in the object model may be detected as having been completed after multiple changes in the object model have occurred. For example, if, in response to the action, multiple new elements have been generated in the web page and, consequently, in the object model of the web page, the change may not be considered to have completed occurring until each of the changes in the object model are complete.

According to some embodiments, a second action may be determined (step 1812) based on a conditionality for a particular playback action among the ordered plurality of playback actions in the conditional playback performance skeleton. For example, where the conditional playback performance skeleton is derived from a conditional recorded performance skeleton, performance controller 223 may determine (step 1813) whether the conditionality for an indirect playback action is met.

Having determined (step 1812) the second action and upon determining (step 1813) that the conditionality for the second action is met, performance controller 223 sends (step 1814) a second action message based on the playback performance skeleton and the received (step 1810) update message relating to changes in the object model. The second action message may, for example, contain instructions for headless browser 219 to perform the second action on the web page. Performance controller 223 may base the second action message on the indication of the change in the object model or on the first action. The second action message may also be a sequential action based on the task data previously defined in the recording steps or stored in a recording library.

Upon determining (step 1813) that the conditionality for the second action has not been met, performance controller 223 may carry on without sending the second action message.

Figure 19:
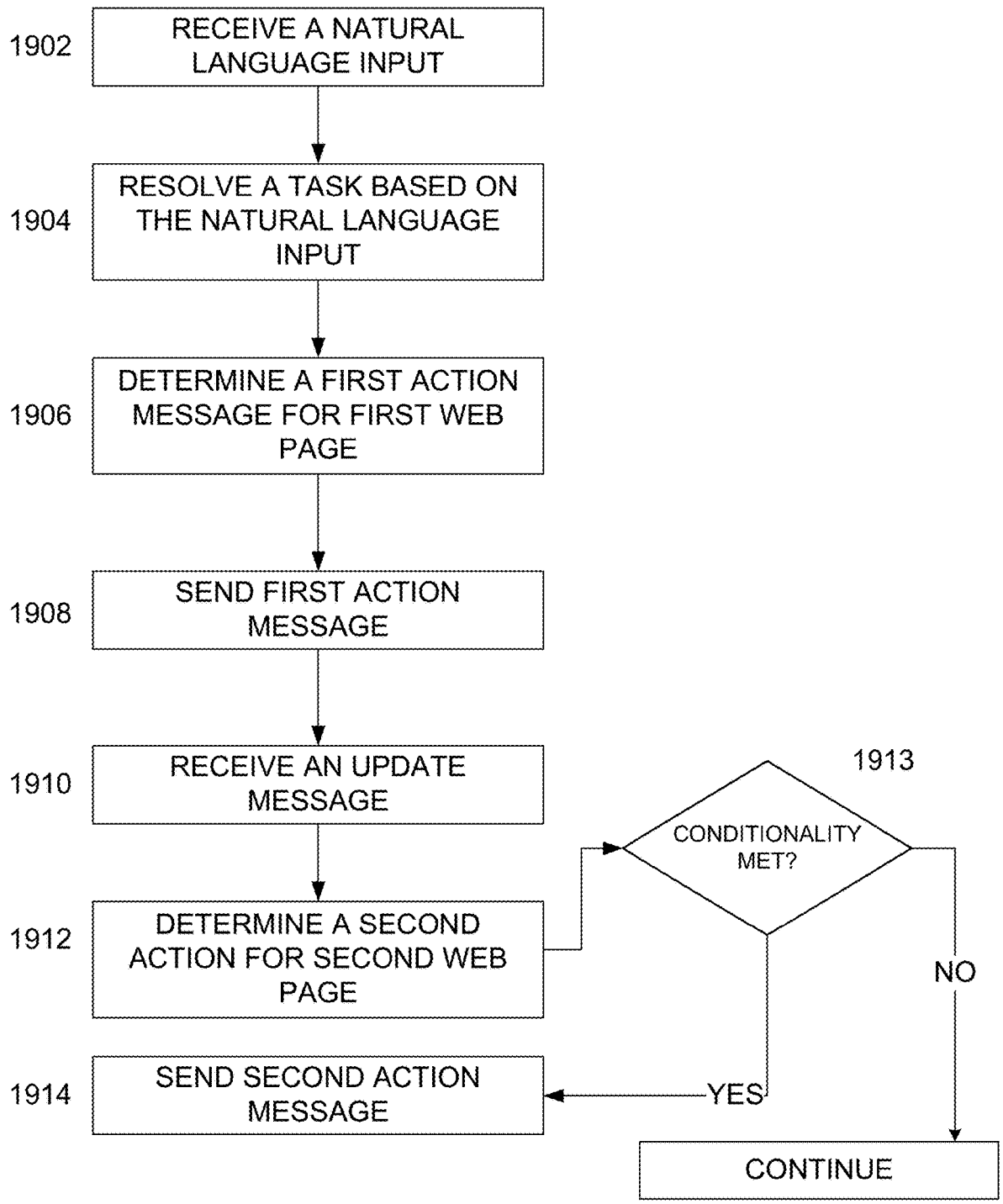
FIG. 19 illustrates example steps in a method of executing a task on two web pages based on a natural language input, according to one embodiment.

FIG. 19 illustrates example steps in a method of executing a task on two web pages, according to one embodiment.

Initially, natural language processor 224 receives (step 1902) natural language input 1202 (see FIG. 12). Natural language input 1202 could be a text input through a chat window or may be a voice input converted to text using speech-to-text algorithms. Natural language input 1202 may be indicative of a task to be performed and may include information about details of the performance of the task.

Natural language processor 224 resolves (step 1904) the task to be performed on a first web page and a second web page, based on natural language input 1202. Resolving (step 1904) the task can include resolving the intent of the task but can also include resolving missing or ambiguous task related attributes. Resolving a task can also include determining the two web pages on which to perform the task. According to some embodiments, natural language processor 224 may resolve missing or ambiguous task-related attributes relating to indirect actions from an identified conditional recorded performance skeleton 354 in task database 222.

Performance controller 223 determines (step 1906) a first action message based on the playback performance skeleton. The action message includes instructions for causing headless browser 219 to perform a first action on the first web page. The first action may be a mouse click, a mouse scroll, a mouse cursor hover, a drag-and-drop, or a keyboard input, simulating what would have been an input event from user 102 interacting with user interface 158 of user device 104. According to some embodiments, a server hosting playback engine 210 may send (step 1908) the first action message.

Subsequent to performance controller 223 sending (step 1908) the first action message, headless browser 219 can then perform the first action on the first web page. The performance of the first action can cause a change in a first object model for the first web page. As discussed hereinbefore, the first object model may be a hierarchical tree structure rendering of a web page like the known DOM.

Subsequent to the performing of the action, an update message is received (step 1910) from headless browser 219 regarding a change in the first object model. The change may be detected mutation observers configured to observe changes that have taken place in the first object model and in which elements of the first object model the changes have taken place. According to some embodiments, the change detected in the first object model may be caused indirectly by the first action performed. For example, if the first action was "send an original email message," one of the mutation observers may detect that a response email message to the original email message has been received.

Performance controller 223 next determines (step 1912) a second action to be performed on the second web page, based on the change in the first object model of the first web page and the playback performance skeleton. According to some embodiments, the change in the first object model may be detected as having been completed after multiple changes in the first object model have occurred. For example, if, in response to the action, multiple new elements have been generated in the web page and, consequently, in the first object model of the web page, the change may not be considered to have completed occurring until each of the changes in the first object model are complete.

According to some embodiments, the second action message may be determined based on a conditionality in a conditional playback performance skeleton. For example, where the conditional playback performance skeleton is derived from a conditional recorded performance skeleton, performance controller may determine (step 1913) whether the conditionality for an indirect playback action is met.

Having determined (step 1912) the second action and upon determining (step 1913) that the conditionality for the second action is met, performance controller 223 sends (step 1914) a second action message for a second action to be performed on the second web page. The second action message may, for example, contain instructions for headless browser 219 to perform the second action on the second web page. Performance controller 223 may base the second action message on the indication of the change in the first object model or on the previous action. The second action message may also be a sequential action based on the task data previously defined in the recording steps or stored in a recording library.

Upon determining (step 1913) that the conditionality for the second action has not been met, performance controller 223 may carry on without sending the second action message.

Aspects of the present application relate to determining that a web element has a similarity to a known web element. Such similarity determining may be used in web task automation, as the web page on which a given recorded task is to be carried out may not be identical to the web page on which the given task has been recorded. Accordingly, a known web element may be compared to all web elements on a single web page to determine a similarity between the known web element from a known web page (such as the web page from which recorded performance skeleton 352 was generated using) and a new web element from a new web page (such as the webpage for performing the task) comprising a plurality of new web elements. Determining web element similarity may leverage vector representations and/or geometric representations of web elements.

Figure 20:
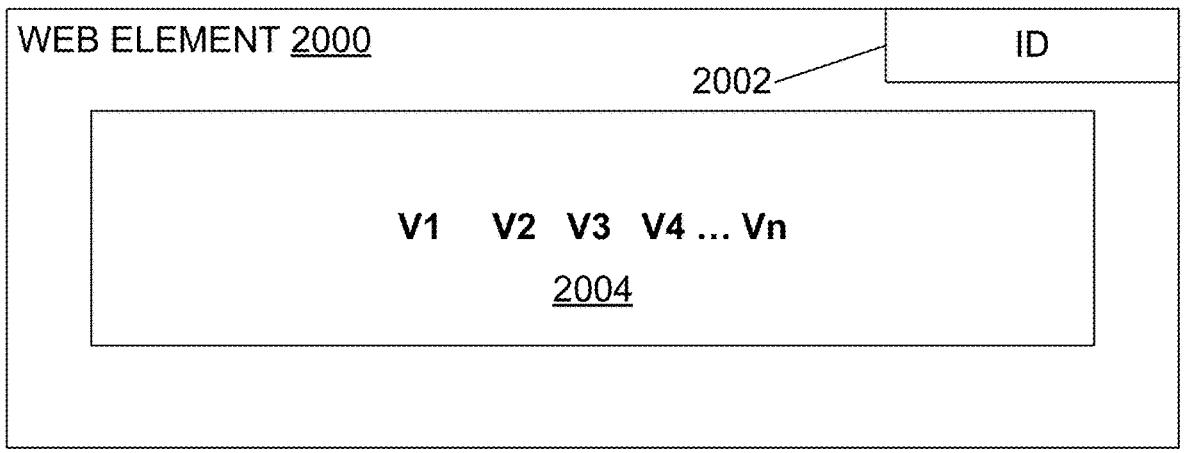
FIG. 20 illustrates, as a visual representation of a web element of a web page according to one embodiment.

According to some embodiments, a web element in a web page may be represented as a plurality of vectors. An example of such a representation is shown in FIG. 20. A single web element 2000 having unique identifier 2002 is represented using a plurality of vectors 1204 (shown as $\hat{V}_1$-$\hat{V}_n$). The individual vectors within plurality of vectors 2004 may be representative of various properties of the web element. For example, vectors 2004 may be indicative of the position, height, width, a tag or class used in the object model, or text contained in the web element. The components of the vector are numerical.

For example, a "compose" button on a web page may have a certain size, tag, class, and text. According to some embodiments, a size vector may be a float vector constructed by normalizing the coordinates of the top left corner of an element, as well as its height and width. According to some embodiments, vectors 2004 may be generated using so-called one-hot encoding or using a general-purpose language representation model, such as the known DistilBERT general-purpose language representation model.

Figure 21:
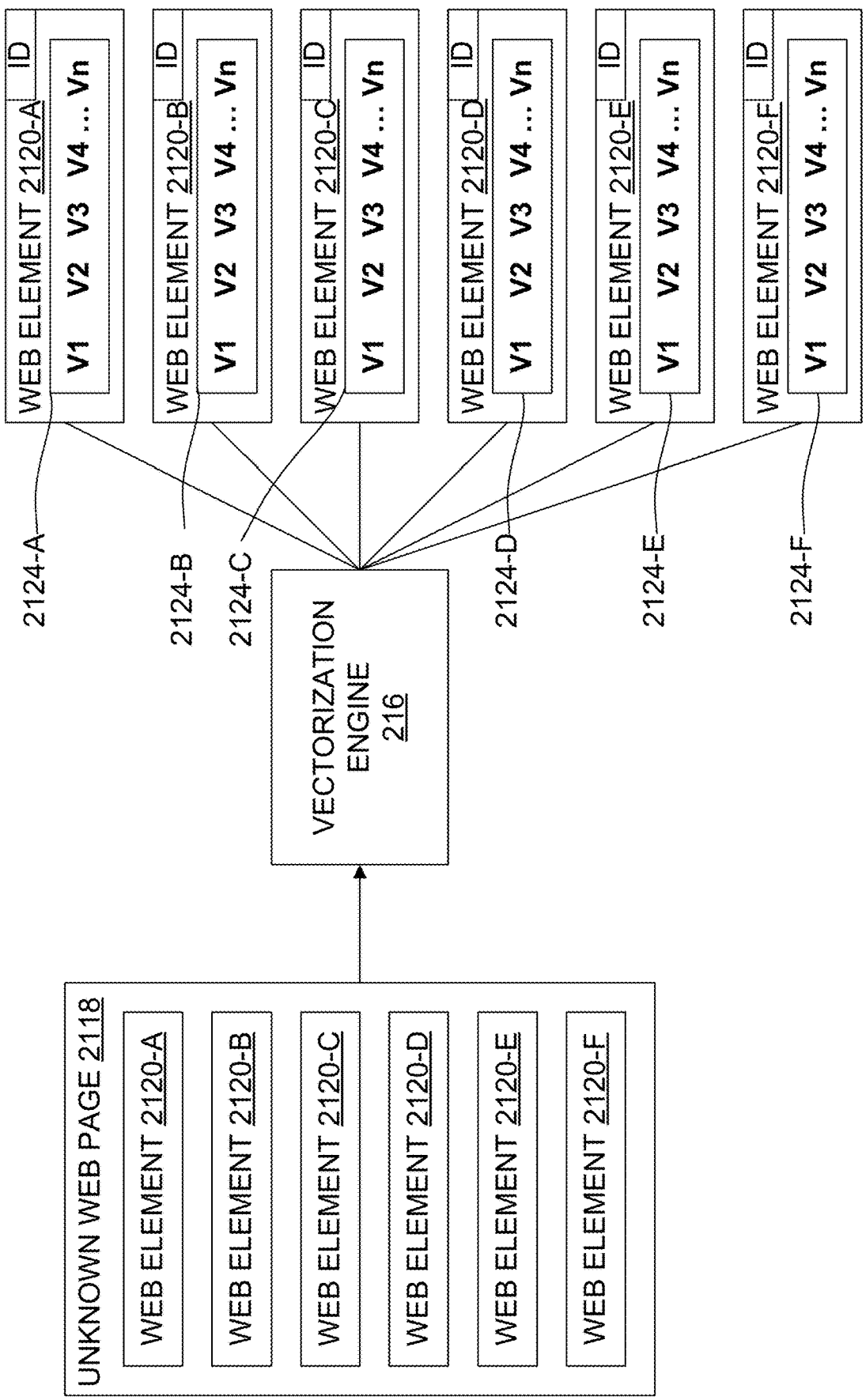
FIG. 21 illustrates a vectorization engine generating representations of web elements in a web page, according to one embodiment.

FIG. 21 shows use of vectorization engine 216, implemented by playback engine processor 214 (see FIG. 2), for an unknown web page 2118 having a plurality of web elements 2120-A, 2120-B, 2120-C, 2120-D, 2120-E, 2120-F (collectively or individually 2120), a separate plurality of vectors 2124-A, 2124-B, 2124-C, 2124-D, 2124-E, 2124-F may be generated in vectorized mode for each web element 2120. This generating may be accomplished by passing each web element 2120, or object model branch, through vectorization engine 216 to generate the corresponding plurality of vectors in vectorized model. The individual vectors within the plurality of vectors in vectorized model may be representative of various properties of the web element. For example, vectors may be indicative of the position, height, width, a tag or class used in the object model, or text contained in the web element. The components of the vector are numerical.

Figure 22:
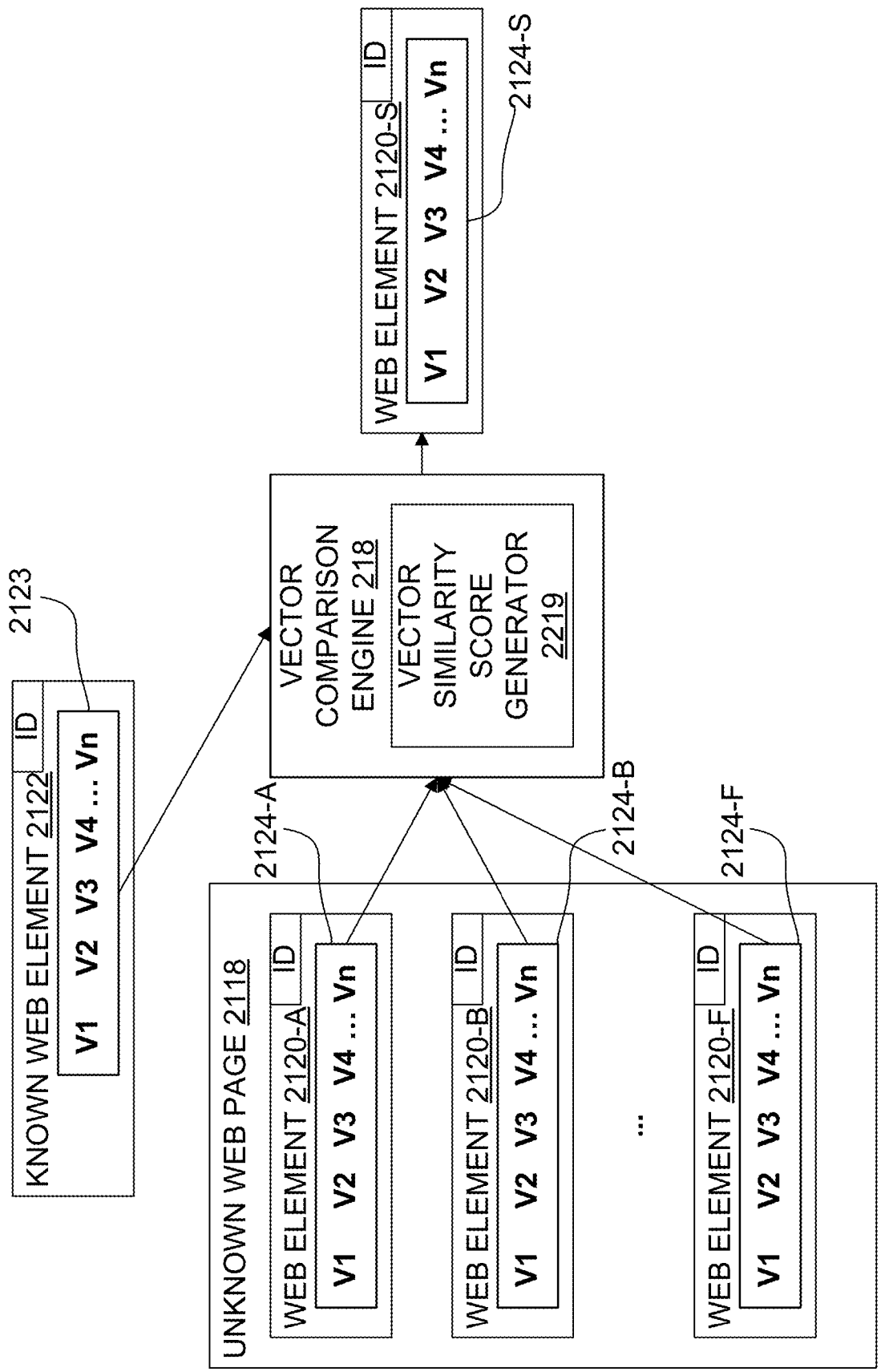
FIG. 22 illustrates a vector comparison engine comparing web elements in a unknown web page to a known web element, according to one embodiment.

FIG. 22 shows the use of vector comparison engine 218, implemented by playback engine processor 214 (see FIG. 2). Vector comparison engine 218 includes a vector similarity score generator 2219 for generating a similarity score between the inputs, namely a plurality 2123 of vectors associated with a known web element 2122, and each plurality 2124 of vectors in vectorized model for web elements 2120 of unknown web page 2118. Vector comparison engine 218 can output a single web element 2120-S, selected from among the plurality of vectors in vectorized model corresponding to web elements 2120 in unknown web page 2118. Selecting single web element 2120-S involves determining that a plurality 2124-S of vectors for single web element 2120-S has the highest similarity score when compared to the plurality 2123 of vectors for known web element 2122. According to some embodiments, a candidate set of vectors may be selected having a similarity score above a threshold.

Vector similarity score generator 2219 may use a comparison algorithm to generate the similarity score between the plurality 2123 of vectors for known web element 2122 and the corresponding plurality 2124 of vectors for each of web elements 2120 of unknown web page 2118. The comparison algorithm may involve comparing individual vectors to, thereby, generate a similarity score. One example of a similarity score between vectors is found using a cosine distance. Aggregating the cosine distance between each individual vector among the plurality 2123 of vectors for known web element 2122 and corresponding vectors among the plurality of vectors in a vectorized model for each web element 2120 of unknown web page 2118 may be seen to generate an overall similarity score.

Figure 23:
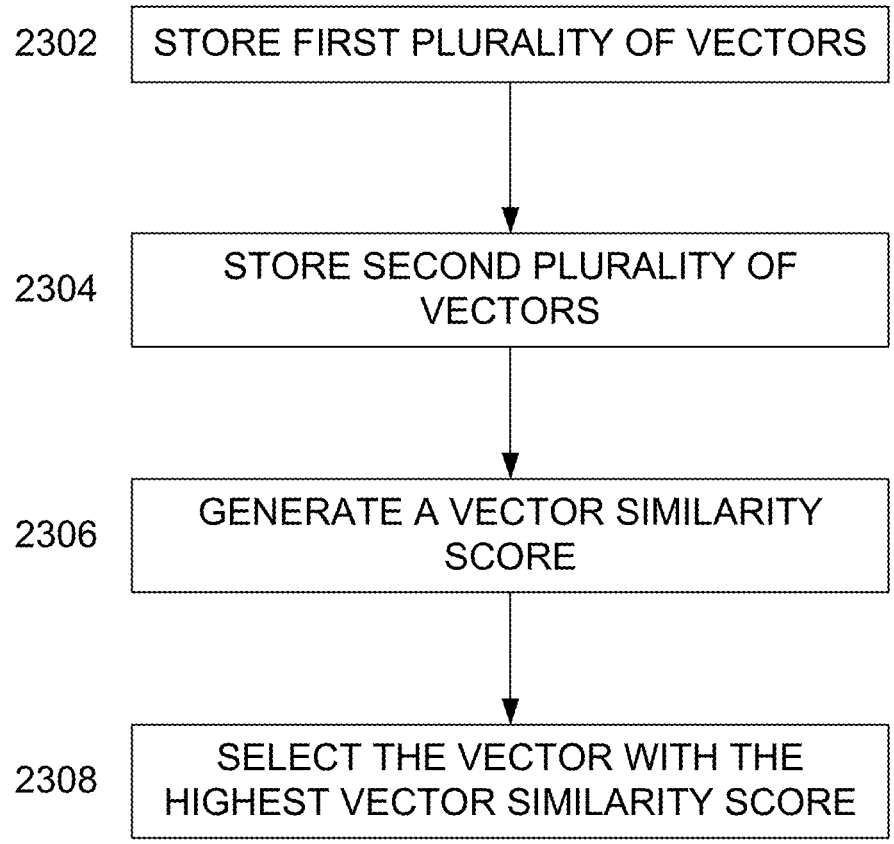
FIG. 23 illustrates example steps in a computer-implemented method of determining a web element having most similarity to a known web element, according to one embodiment.

FIG. 23 illustrates example steps in a method of determining selected web element 2120-S, among a plurality of web elements 2120, where selected web element 2120-S has most similarity to known web element 2122, according to one embodiment. The plurality of web elements 2120 may be from unknown web page 2118. As a precursor to the method illustrated in FIG. 23, vectorized model of each web element 2120 may be generated and stored. According to some embodiments, vectorized model of each web element 2120 includes a plurality of vectors. The individual vectors within the vectorized model may be representative of various properties of corresponding web element 2120. For example, vectors may be indicative of a position, a height, a width, a tag or a class used in the object model, or text contained in web element 2120. The components of the vector are be numerical.

Initially, vector comparison engine 218 (FIG. 2) stores (step 2302) the plurality 2123 of vectors for known web element 2122. Known web element 2122 may have a known functionality and have an individual branch within a hierarchical tree structure, like an object model, such as the Document Object model (DOM).

Vector comparison engine 218 then stores (step 2304) each plurality of vectors in vectorized models (FIG. 22), one plurality of vectors in a vectorized model for each web element 2120 in the plurality of web elements in unknown web page 2118. The vectors in each plurality of vectorized models may be generated by vectorization engine 216 (FIG. 21), having regard to the object model of unknown web page 2118 and a position, a height, a width, a tag or a class used in the object model, or text contained in web element 2120.

Vector comparison engine 218 subsequently generates (step 2306) a similarity score between each vector in the plurality 2123 of vectors for known web element 2122 and the corresponding vector in one of the pluralities 2124 of vectors in vectorized model for web element 2120 of unknown web page 2118. According to some embodiments, the similarity score may be based on a cosine distance, and an overall similarity score may be generated using an aggregate cosine distance for the individual vectors. According to some embodiments, specific vectors in the plurality 2123 of vectors and vectors in vectorized models may be weighted differently in the generation of the similarity score.

Vector comparison engine 218 selects (step 2308) web element 2120 associated with the plurality of vectors in vectorized model having the highest similarity score to the selected web element 2120-S. The selected web element 2120-S has the greatest similarity to known web element 2122. Accordingly, in the automation of a task, the selected web element 2120-S may be identified, for example, as the "compose" button, a mouse click on which initiates composition of an email message in the unknown web page 2118. The xPath for this web element 2120-S can be used as the object model xPath in xPath column 906 in playback performance skeleton 1400 (see FIG. 14) to perform the actions of the intended task.

Figure 24:
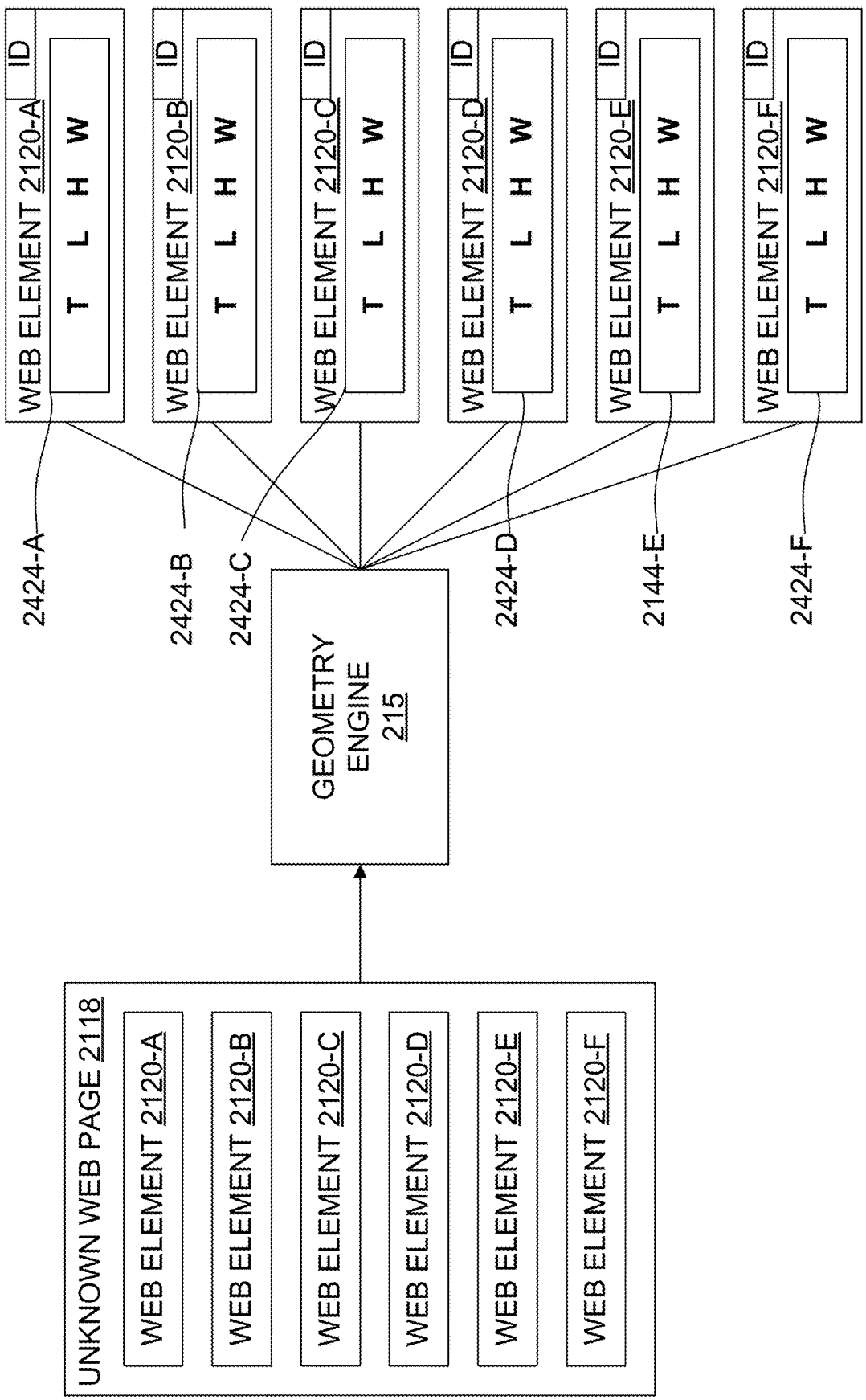
FIG. 24 illustrates a geometry engine generating representations of web elements in a web page, according to one embodiment.

FIG. 24 shows use of geometry engine 215, implemented by playback engine processor 214 (see FIG. 2). For unknown web page 2118 having a plurality of web elements 2120-A, 2120-B, 2120-C, 2120-D, 2120-E, 2120-F (collectively or individually 2120), a separate plurality of geometries 2424-A, 2424-B, 2424-C, 2424-D, 2424-E, 2424-F may be generated in geometrized mode for each web element 2120. This generating may be accomplished by determining, based on the object model 310, the top, left, height, and width, for each web element. According to some embodiments, geometries may only be considered from among a candidate set of web elements 2120 having a similarity score above a threshold as generated using the method described in FIG. 23.

Figure 25:
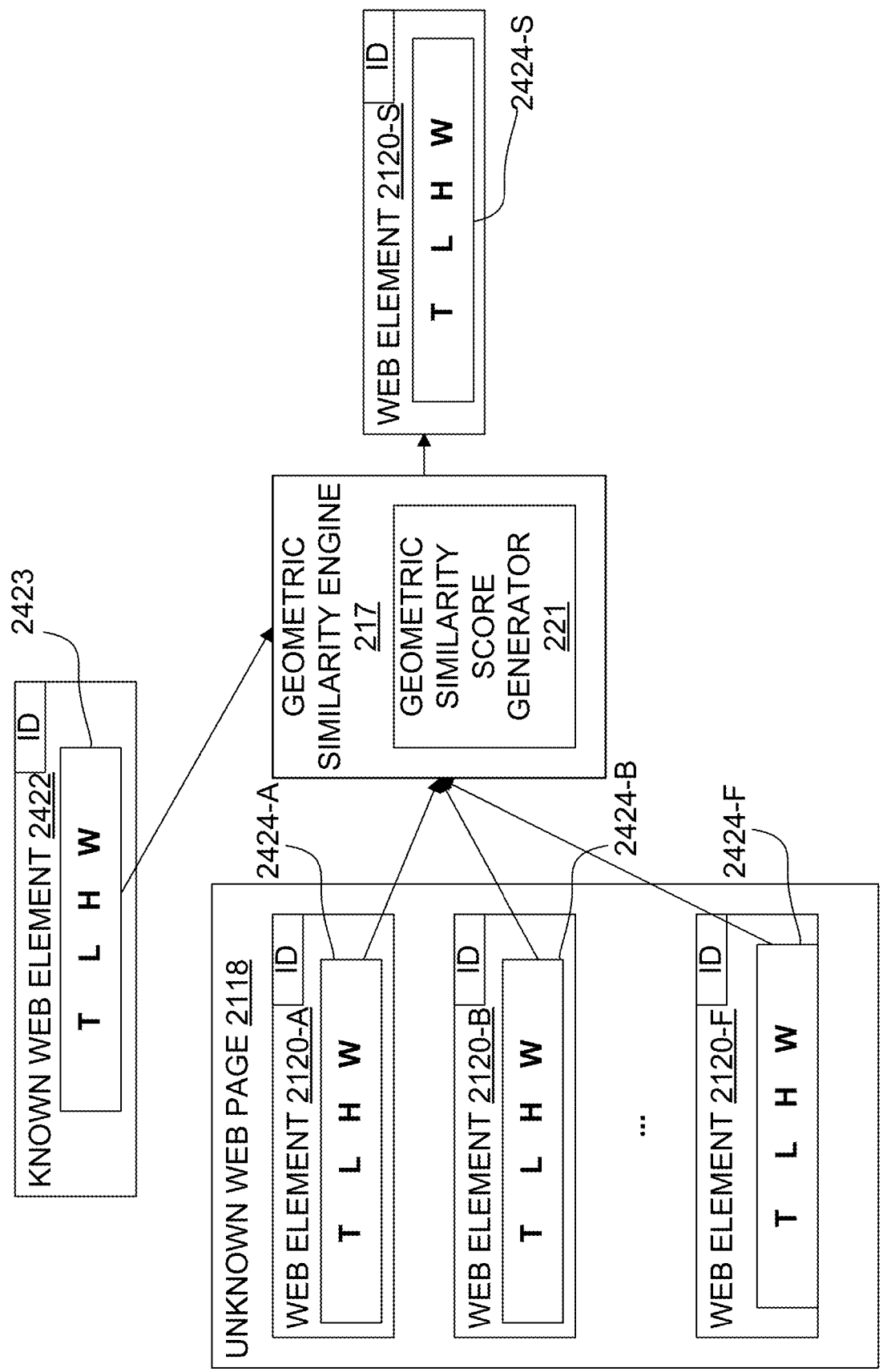
FIG. 25 illustrates a geometric similarity engine comparing web elements in a unknown web page to a known web element, according to one embodiment.

FIG. 25 shows the use of geometric similarity engine 217, implemented by playback engine processor 214 (see FIG. 2). Geometric similarity engine 217 includes a geometric similarity score generator 221 for generating a similarity score between the inputs, namely the geometry 2423 for known web element 2422 and each plurality 2424 of geometries for unknown web page 2118. Geometric similarity engine 217 can output a single web element 2120-S, selected from among the plurality of geometries 2424 corresponding to web elements 2120 in unknown web page 2118. Selecting single web element 2120-S involves determining that a geometry 2424-S for single web element 2120-S has the highest similarity score when compared to the geometry 2423 for known web element 2422.

Geometric similarity score generator 221 may use a comparison algorithm to generate the similarity score between the geometry 2423 for known web element 2422 and the corresponding plurality 2424 of geometries for each of web elements 2120 of unknown web page 2118. The comparison algorithm may involve comparing the geometries to, thereby, generate a similarity score. One example of a similarity score between geometries is found using an intersection-over-union analysis, also known as a Jaccard index. Generating a similarity score involves using the intersection-over-union analysis between the geometry 2423 for known web element 2422 and corresponding geometries 2424 for each web element 2120 of unknown web page 2118. The intersection-over-union analysis may result in a highest value for geometries that cover the exact same range at the same position. The intersection-over-union analysis may result in a lowest similarity score for geometries that do not have any overlapping.

According to some embodiments, based on an intersection-over-union analysis as done by score generator, a stored property or object model action may be changed in a playback performance skeleton. For example, if two web elements completely overlap geometrically, a stored model of one web element may be modified to include a specific text label from identical text labels to be applied to the second web element.

Figure 26:
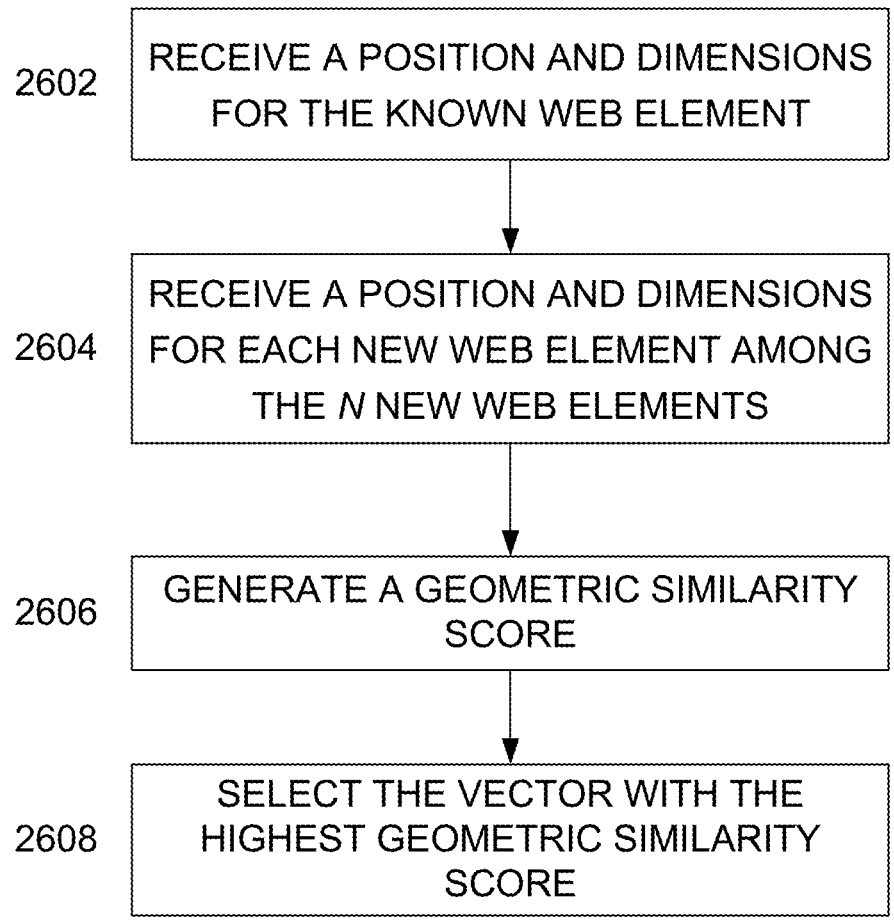
FIG. 26 illustrates example steps in a computer-implemented method of determining a web element having most similarity to a known web element, according to another embodiment.

FIG. 26 illustrates example steps in a method of determining selected web element 2120-S, among a plurality of web elements 2120, where selected web element 2120-S has most similarity to known web element 2422. The plurality of web elements 2120 may be from unknown web page 2118. As a precursor to the method illustrated in FIG. 26, the position and size of each web element 2120 may be generated by geometry engine 215 and stored in memory 221. According to some embodiments, the position and size of each web element 2120 includes a top, left, height and width component as generated from the object model.

Initially, geometric comparison similarity engine 217 (FIG. 2) receives (step 2602) and stores the position and dimensions for known web element 2422. The geometric comparison similarity engine 217 may generate geometries based on a candidate set as determined by the method of FIG. 24. Known web element 2422 may have a known functionality and have an individual branch within a hierarchical tree structure, like an object model, such as the DOM. Geometric similarity engine 217 further receives (step 2604) geometry 2424 for web elements 2120 of unknown web page 2118.

Geometric similarity score generator 221 subsequently generates (step 2606) a similarity score between geometry 2423 for known web element 2422 and the each geometry 2424 for web element 2120 of unknown web page 2118. According to some embodiments, generating the similarity score may use an intersection-over-union analysis.

Geometric similarity engine 217 selects (step 2608) web element 2120 associated with the geometry 2424 having the highest similarity score to be the selected web element 2120-S. The selected web element 2120-S has the greatest similarity to known web element 2422. Accordingly, in the automation of a task, the selected web element 2120-S may be identified, for example, as the correct "search" field when trying to select one of may search fields, the field appropriate for carrying out the task on the unknown web page 2118. This web element 2420-S can be used as the object model xPath 906 in playback performance skeleton 1400 in order to perform the actions intended task (FIG. 14).

Although aspects of the present application have been described with reference to specific features and embodiments thereof, various modifications and combinations can be made thereto. The description and drawings are, accordingly, to be regarded simply as an illustration of some embodiments as defined by the appended claims, and are contemplated to cover any and all modifications, variations, combinations or equivalents that fall within the scope. Therefore, although aspects of the present application and its advantages have been described in detail, various changes, substitutions, and alterations can be made herein. Moreover, the scope of the present application is not intended to be limited to the particular embodiments of the process, machine, manufacture, composition of matter, means, methods and steps described in the specification. As one of ordinary skill in the art will readily appreciate from the disclosure of the present application, processes, machines, manufacture, compositions of matter, means, methods, or steps, presently existing or later to be developed, that perform substantially the same function or achieve substantially the same result as the corresponding embodiments described herein may be utilized according to the present application. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, memory, such as random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

The invention claimed is:

1. A computer-implemented method of selecting a new web element among a plurality, "n," of new web elements in a new web page on which a task is to be automatically performed, the selected new web element related to a known web element, where interaction with the known web element has been previously recorded in a first document, the method comprising:
generating a second document based on the first document, the second document including a reference to the known web element;
storing a first plurality of vectors for the known web element;
storing n second pluralities of vectors, one second plurality of vectors for each new web element among the n new web elements, each second plurality of vectors having a plurality, "m," of vectors;
wherein each vector among the m vectors in each second plurality of vectors among the second pluralities of vectors has a corresponding vector in the first plurality of vectors;
for each second plurality of vectors of the n second pluralities of vectors, generating a similarity score between:
each vector in the first plurality of vectors; and
the corresponding vector in the each second plurality of vectors;
selecting the new web element having the second plurality of vectors with the highest similarity score, thereby identifying the selected new web element that is most related to the known web element; and
updating the second document to replace the reference to the known web element with a reference to the selected new web element.

2. The method of claim 1, wherein a vector in the first plurality of vectors is representative of a property of the known web element in an object model.

3. The method of claim 2, wherein the property comprises at least one of:
a tag for the known web element,
a class for the known web element,
a position for the known web element,
a height for the known web element,
a width for the known web element, and
a text used within known web element.

4. The method of claim 2, wherein the object model comprises a Document Object Model (DOM).

5. The method of claim 1, wherein a vector in the second plurality of vectors is representative of a property of the new web element in an object model.

6. The method of claim 5, wherein the property comprises at least one of:
a tag for the new web element,
a class for the new web element,
a position for the new web element,
a height for the new web element,
a width for the new web element, and
a text used within new web element.

7. The method of claim 5, wherein the object model comprises a Document Object Model (DOM).

8. The method of claim 1, wherein the generating the similarity score comprises determining an aggregated cosine distance.

9. A computer-implemented method of selecting a new web element among a plurality, "n," of new web elements in a new web page on which a task is to be automatically performed, the selected new web element related to a known web element, where interaction with the known web element has been previously recorded in a first document, the method comprising:
generating a second document based on the first document, the second document including a reference to the known web element;
receiving a position and dimensions for the known web element;
receiving a position and dimensions for each new web element among the n new web elements;
for each new web element among the n new web elements, generating a similarity score between:

the position and dimensions of the known web element; and the position and dimensions of the each n new web element;

selecting the new web element with the highest similarity score, thereby identifying the selected new web element most related to the known web element; and updating the second document to replace the reference to the known web element with a reference to the selected new web element.

10. The method of claim 9, wherein the generating the similarity score comprises using an intersection-over-union analysis.

11. The method of claim 9, wherein the plurality n of new web elements is a candidate set of web elements.

12. The method of claim 11, comprising determining the candidate set of web elements.

13. The method of claim 12, wherein the determining comprises:

storing a first plurality of vectors for the known web element;

storing n second pluralities of vectors, one second plurality of vectors for each new web element among the n new web elements, each second plurality of vectors having a plurality, "m," of vectors;

wherein each vector among the m vectors in each second plurality of vectors among the second pluralities of vectors has a corresponding vector in the first plurality of vectors;

for each second plurality of vectors of the n second pluralities of vectors, generating a vector similarity score between:

each vector in the first plurality of vectors; and the corresponding vector in the each second plurality of vectors; and selecting the candidate plurality of web elements being the second pluralities of vectors with the vector similarity score above a threshold.

14. The method of claim 13, wherein the generating the vector similarity score comprises determining an aggregate cosine distance.

15. The method of claim 13, wherein a vector in the first plurality of vectors is representative of a property of the known web element in an object model.

16. The method of claim 15, wherein the property of the known web element comprises at least one of:

a tag for the known web element,
a class for the known web element,
a position for the known web element,
a height for the known web element,
a width for the known web element, and
a text used within the known web element.

17. The method of claim 15, wherein the object model comprises a Document Object Model (DOM).

18. The method of claim 13, wherein a vector in the second plurality of vectors is representative of a property of the new web element in an object model.

19. The method of claim 18, wherein the property of the new web element comprises at least one of:

a tag for the new web element,
a class for the new web element,
a position for the new web element,
a height for the new web element,
a width for the new web element, and
a text used within the new web element.

20. The method of claim 18, wherein the object model comprises a Document Object Model (DOM).

21. A computer-implemented method of selecting a new web element among a plurality, "n," of new web elements in a new web page on which a task is to be automatically performed, the selected new web element related to a known web element, where interaction with the known web element has been previously recorded in a first document, the method comprising:

generating a second document based on the first document, the second document including a reference to the known web element;

storing a first plurality of vectors for the known web element;

storing n second pluralities of vectors, one second plurality of vectors for each new web element among the n new web elements, each second plurality of vectors having a plurality, "m," of vectors;

wherein each vector among the m vectors in each second plurality of vectors among the second pluralities of vectors has a corresponding vector in the first plurality of vectors;

for each second plurality of vectors of the n second pluralities of vectors, generating a similarity score between:

each vector in the first plurality of vectors; and the corresponding vector in the each second plurality of vectors;

determining that no second plurality of vectors have a similarity score above a threshold;

responsive to the determining that no second plurality of vectors have a similarity score above a threshold:

establishing a virtual network computing (VNC) connection to an electronic device;

transmitting a visual representation of the new web page;

receiving an indication of a pixel location of a particular web element in the visual representation; and selecting, as the new web element, the particular web element at the pixel location; and updating the second document to replace the reference to the known web element with a reference to the new web element.

* * * * *